(12) United States Patent
Logan

(10) Patent No.: US 8,962,165 B2
(45) Date of Patent: Feb. 24, 2015

(54) MATERIALS AND CONFIGURATIONS FOR SCALABLE MICROBIAL FUEL CELLS

(75) Inventor: Bruce Logan, State College, PA (US)

(73) Assignee: The Penn State Research Foundation, University Park, PA (US)

(*) Notice: Subject to any disclaimer, the term of this patent is extended or adjusted under 35 U.S.C. 154(b) by 1327 days.

(21) Appl. No.: 11/799,194

(22) Filed: May 1, 2007

(65) Prior Publication Data
US 2007/0259217 A1 Nov. 8, 2007

Related U.S. Application Data

(60) Provisional application No. 60/796,761, filed on May 2, 2006.

(51) Int. Cl.
H01M 8/16 (2006.01)
H01M 4/86 (2006.01)
H01M 4/96 (2006.01)
H01M 4/90 (2006.01)

(52) U.S. Cl.
CPC ........ *H01M 8/16* (2013.01); *H01M 4/90* (2013.01); *H01M 4/8657* (2013.01); *Y02E 60/527* (2013.01)
USPC .............................................. 429/2; 429/401

(58) Field of Classification Search
USPC ..................................................... 429/2, 401
See application file for complete search history.

(56) References Cited

U.S. PATENT DOCUMENTS

| 4,652,501 A | 3/1987 | Bennetto et al. |
| 4,891,404 A | 1/1990 | Narayan et al. |
| 5,256,501 A | 10/1993 | Hasvold et al. |
| 5,427,871 A | 6/1995 | Garshol et al. |
| 5,683,558 A | 11/1997 | Sieck et al. |
| 5,976,719 A | 11/1999 | Kim et al. |
| 6,090,266 A | 7/2000 | Roychowdhury |
| 6,217,822 B1* | 4/2001 | Borglum ................ 264/632 |
| 6,887,692 B2 | 5/2005 | Paterek |

(Continued)

FOREIGN PATENT DOCUMENTS

| WO | WO 9103079 | 3/1991 |
| WO | WO-0139306 | 5/2001 |

(Continued)

OTHER PUBLICATIONS

Oh, S. and B.E. Logan. "Proton exchange membrane and electrode surface areas as factors that affect power generation in microbial fuel cells." Applied Microbiology and Biotechnology 2006, vol. 70, pp. 162-169.

(Continued)

*Primary Examiner* — Milton I Cano
*Assistant Examiner* — Brent Thomas
(74) *Attorney, Agent, or Firm* — Gifford, Krass, Sprinkle, Anderson & Citkowski, P.C.

(57) ABSTRACT

Devices for production of electricity and/or hydrogen gas are provided by the present invention. In particular, microbial fuel cells for production of electricity and modified microbial fuel cells for production of hydrogen are detailed. A tube cathode is provided which includes a membrane forming a general tube shape. An anode is provided which has a specific surface area greater than 100 m²/m³. In addition, the anode is substantially non-toxic to anodophilic bacteria. Combinations of particular anodes and cathodes are included in microbial fuel cells and modified microbial fuel cells.

31 Claims, 14 Drawing Sheets

(56) References Cited

U.S. PATENT DOCUMENTS

| | | | |
|---|---|---|---|
| 2002/0025469 | A1* | 2/2002 | Heller ............................ 429/43 |
| 2004/0094406 | A1 | 5/2004 | Sawada |
| 2005/0095466 | A1 | 5/2005 | Minteer et al. |
| 2006/0011491 | A1 | 1/2006 | Logan et al. |
| 2006/0147763 | A1* | 7/2006 | Angenent et al. ................ 429/2 |
| 2006/0160200 | A1* | 7/2006 | Rathenow et al. ............ 435/177 |
| 2006/0172186 | A1* | 8/2006 | Tender .......................... 429/119 |
| 2006/0234110 | A1 | 10/2006 | Bergel |
| 2007/0042480 | A1 | 2/2007 | Rozendal et al. |
| 2007/0048577 | A1* | 3/2007 | Ringeisen et al. .............. 429/30 |
| 2007/0062820 | A1* | 3/2007 | Smotkin ....................... 205/742 |
| 2007/0172710 | A1 | 7/2007 | Kruesi |
| 2007/0259216 | A1 | 11/2007 | Logan |
| 2007/0259217 | A1 | 11/2007 | Logan |
| 2008/0220292 | A1 | 9/2008 | Rabaey et al. |
| 2008/0251445 | A1 | 10/2008 | Kamleiter et al. |
| 2008/0277273 | A1 | 11/2008 | Logan |
| 2008/0286624 | A1 | 11/2008 | Lovley et al. |
| 2008/0292912 | A1 | 11/2008 | Logan |
| 2009/0029198 | A1 | 1/2009 | Jin et al. |

FOREIGN PATENT DOCUMENTS

| | | |
|---|---|---|
| WO | WO-2004/015172 | 2/2004 |
| WO | WO-2005005981 | 1/2005 |
| WO | WO-2007/010313 | 1/2007 |
| WO | WO-2008/063843 | 5/2008 |
| WO | WO-2008/109962 | 9/2008 |

OTHER PUBLICATIONS

Logan, B., S. Cheng, V. Watson, and G. Estadt. "Graphite Fiber Brush Anodes for Increased Power Production in Air Cathode Microbial Fuel Cells." Environmental Science and Technology 2007, vol. 41, pp. 3341-3346.

Oh, S., B. Min, and B.E. Logan. "Cathode Performance as a Factor in Electricity Generation in Microbial Fuel Cells." Environmental Science and Technology 2004, vol. 38, pp. 4900-4904.

Liu, H., S. Cheng, and B.E. Logan. "Power Generation in Fed-Batch Microbial Fuel Cells as a Function of Ionic Strength, Temperature, and Reactor Configuration." Environmental Science and Technology 2005, vol. 39, pp. 5488-5493.

Cheng, S., H. Liu, and B. Logan. "Increased Power Generation in a Continuous Flow MFC with Adjective Flow through the Porous Anode and Reduced Electrode Spacing." Environmental Science and Technology 2006, vol. 40, pp. 2426-2432.

Logan, B.E., B. Hamelers, R. Rozendal, U. Schroder, J. Keller, S. Freguia, P. Aelterman, W. Verstraete, and K. Rabaey. "Microbial Fuel Cells: Methodology and Technology." Environmental Science and Technology 2006, vol. 40, pp. 5181-5192.

Cheng, S. and B.E. Logan. "Ammonia treatment of carbon cloth anodes to enhance power generation of microbial fuel cells." Electrochemistry Communications 2007, vol. 9, pp. 492-496.

Cheng, S., H. Liu, and B.E. Logan. "Power Densities Using Different Cathode Catalysts (Pt and CoTMPP) and Polymer Binders (Nafion and PTFE) in Single Chamber Microbial Fuel Cells." Environmental Science and Technology 2006, vol. 40, 364-369.

Cheng, S., H. Liu, and B.E. Logan. "Increased performance of single-chamber microbial fuel cells using an improved cathode structure." Electrochemistry Communications 2006, vol. 8, pp. 489-494.

Liu, H., S. Grot, and B.E. Logan. "Electrochemically Assisted Microbial Production of Hydrogen from Acetate." Environmental Science and Technology 2005, vol. 39, pp. 4317-4320.

Liu, H. and B.E. Logan. "Electricity Generation Using an Air-Cathode Single Chamber Microbial Fuel Cell in the Presence and Absence of a Proton Exchange Membrane." Environmental Science and Technology 2004, vol. 38, pp. 4040-4046.

Liu, H., R. Ramnarayanan, and B.E. Logan. "Production of Electricity during Wastewater Treatment Using a Single Chamber Microbial Fuel Cell." Environmental Science and Technology 2004, vol. 38, pp. 2281-2285.

Liu, H., S. Cheng, and B.E. Logan. "Production of Electricity from Acetate or Butyrate Using a Single-Chamber Microbial Fuel Cell." Environmental Science and Technology 2005, vol. 39, pp. 658-662.

Kim, J.R., S. Cheng, S. Oh, and B.E. Logan. "Power Generation Using Different Cation, Anion, and Ultrafiltration Membranes in Microbial Fuel Cells." Environmental Science and Technology 2007, vol. 41, pp. 1004-1009.

Zuo, Y., P. Maness, and B.E. Logan. "Electricity Production from Steam-Exploded Corn Stover Biomass." Energy and Fuels 2006, vol. 20, 1716-1721.

Kim, J.R., B. Min, and B.E. Logan. "Evaluation of procedures to acclimate a microbial fuel cell for electricity production." Applied Microbiology and Biotechnology 2005, vol. 68, pp. 23-30.

Logan, B.E. and J.M. Regan. "Electricity-producing bacterial communities in microbial fuel cells." TRENDS in Microbiology 2006, vol. 14, No. 12, pp. 512-518.

Chiou, C.T. and D.E. Kile. "Contaminant Sorption by Soil and Bed Sediment." U.S. Department of the Interior, U.S. Geological Survey: Reston, VA, 2000.

Rabaey, K., K. Van de Sompel, L. Maignien, N. Boon, P. Aelterman, P. Clauwaert, L. de Schamphelaire, H.T. Pham, J. Vermeulen, M. Verhaege, P. Lens, and W. Verstraete. "Microbial Fuel Cells for Sulfide Removal." Environmental Science and Technology 2006, vol. 40, pp. 5218-5224.

Reimers, C.E., L.M. Tender, S. Fertig, and W. Wang. "Harvesting Energy from the Marine Sediment-Water Interface." Environmental Science and Technology 2001, vol. 35, pp. 192-195.

Finkelstein, D.A., L.M. Tender, and J.G. Zeikus. "Effect of Electrode Potential on Electrode-Reducing Microbiota." Environmental Science and Technology 2006, vol. 40, pp. 6990-6995.

He, Z., N. Wagner, S.D. Minteer, and L.T. Andenent. "An Upflow Microbial Fuel Cell with an Interior Cathode: Assessment of the Internal Resistance by Impedance Spectroscopy" Environmental Science and Technology 2006, vol. 40, pp. 5212-5217.

Cai, M., J. Liu, and Y. Wei. "Enhanced Biohydrogen Production from Sewage Sludge with Alkaline Pretreatment." Environmental Science and Technology 2004, vol. 38, pp. 3195-3202.

Hasvold, O., H. Henriksen, E. Melvaer, G. Citi, B.O. Johansen, T. Kjonigsen, R. Galetti. "Sea-water battery for subsea control systems." Journal of Power Sources 1997, vol. 65, pp. 253-261.

Hasvold, O. and N. Storkersen. "Electrochemical power sources for unmanned underwater vehicles used in deep sea survey operations." Journal of Power Sources 2001, vol. 96, pp. 252-258.

Cooper, K.R. and M. Smith. "Electrical test methods for on-line fuel cell ohmic resistance measurement." Journal of Power Sources 2006, vol. 160, pp. 1088-1095.

Tender, L.M., C.E. Reimers, H. A. Stecher III, D.E. Holmes, D.R. Bond, D.A. Lowy, K. Pilobello, S.J. Fertig, and D.R. Lovley. "Harnessing microbially generated power on the seafloor." Nature Biotechnology 2002, vol. 20, pp. 821-825.

Chaudhuri, S.K. and D.R. Lovley. "Electricity generation by direct oxidation of glucose in mediatorless microbial fuel cells." Nature Biotechnology 2003, vol. 21, pp. 1229-1232.

Lovley, D.R. "Microbial Energizers: Fuel Cells That Keep on Going." Microbe 2006, vol. 1, pp. 323-329.

Lowy, D.A., L.M. Tender, J.G. Zeikus, D.H. Park, D.R. Lovley. "Harvesting energy from the marine sediment—water interface II Kinetic activity of anode materials." Biosensors and Bioelectronics 2006, vol. 21, pp. 2058-2063.

Brennan, R.A., R.A. Sanford, and C.J. Werth. "Chitin and corncobs as electron donor sources for the reductive dechlorination of tetrachloroethene." Water Research 2006, vol. 40, pp. 2125-2134.

Niessen, J., U. Schroder, M. Rosenbaum, F. Scholz. "Fluorinated polyanilines as superior materials for electrocatalytic anodes in bacterial fuel cells." Electrochemistry Communications 2004, vol. 6, pp. 571-575.

Park, D.H. and J.G. Zeikus. "Improved Fuel Cell and Electrode Designs for Producing Electricity from Microbial Degradation." Biotechnology and Bioengineering 2002, vol. 81, pp. 348-355.

Kim, N., Y. Choi, S. Jung, S. Kim. "Effect of Initial Carbon Sources on the Performance of Microbial Fuel Cells Containing *Proteus vulgaris*." Biotechnology and Bioengineering 2000, vol. 70, pp. 109-114.

(56) References Cited

OTHER PUBLICATIONS

Bond, D.R., D.E. Holmes, L.M. Tender, D.R. Lovley. "Electrode-Reducing Microorganisms that Harvest Energy from Marine Sediments." Science 2002, vol. 295, pp. 483-485.

Bond, D.R. and D.R. Lovley. "Electricity Production by Geobacter sulfurreducens Attached to Electrodes." Applied and Environmental Microbiology 2003, vol. 69, pp. 1548-1555.

Park, D.H. and J.G. Zeikus. "Electricity Generation in Microbial Fuel Cells Using Neutral Red as an Electronophore." Applied and Environmental Microbiology 2000, vol. 66, pp. 1292-1297.

Lovley, D.R. and D.J. Lonergan. "Anaerobic Oxidation of Toluene, Phenol, and p-Cresol by the Dissimilatory Iron-Reducing Organism, GS-15." Applied and Environmental Microbiology 1990, vol. 56, pp. 1858-1864.

Rabaey, K. G. Lissens, S.D. Siciliano, and W. Verstraete. "A microbial fuel cell capable of converting glucose to electricity at high rate and efficiency." Biotechnology Letters 2003, vol. 25, pp. 1531-1535.

Park, H.S., B.H. Kim, H.S. Kim, H.J. Kim, G.T. Kim, M. Kim, I.S. Chang, Y.K. Park, and H.I. Chang. "A Novel Electrochemically Active and Fe(III)-reducing Bacterium Phylogenetically Related to *Clostridium butyricum* Isolated from a Microbial Fuel Cell." Anaerobe 2001, vol. 7, pp. 297-306.

Park, D.H. and J.G. Zeikus. "Impact of electrode composition on electricity generation in a single-compartment fuel cell using *Shewanella putrefaciens*." Applied Microbiology and Technology 2002, vol. 59, pp. 58-61.

Raz, S., M.J.G. Jak, J. Schoonman, I. Reiss. "Supported mixed-gas fuel cells." Solid State Ionics 2002, vol. 149, pp. 335-341.

Reimers, C.E., P. Girguis, H.A. Stecher III, L.M. Tender, N. Ryckelynck, and P. Whaling. "Microbial Fuel Cell Energy from an Ocean Cold Seep." Geobiology 2006, vol. 4, pp. 123-136.

Kim, H.J., H. S. Park, M.S. Hyun, I.S. Chang, M. Kim, B.H. Kim. "A mediator-less microbial fuel cell using a metal reducing bacterium, *Shewanella putrefaciens*." Enzyme and Microbial Technology 2002, vol. 30, pp. 145-152.

Svitil, A.L. and D.L. Kirchman. "A chitin-binding domain in a marine bacterial chitinase and other microbial chitinases: implications for the ecology and evolution of 1, 4-β-glycanases." Microbiology 1998, vol. 144, pp. 1299-1308.

Lovley, D.R. and E.J. Phillips. "Novel Mode of Microbial Energy Metabolism: Organic Carbon Oxidation Coupled to Dissimilatory Reduction of Iron or Manganese." Applied and Environmental Microbiology 1988, vol. 54, pp. 1472-1480.

Allen, R.M. and H.P. Bennetto. "Microbial fuel-cells: electricity production from carbohydrates." Applied biochemistry and biotechnology 1993, vol. 39-40, pp. 27-40.

Logan, B. "Extracting Hydrogen and Electricity from Renewable Resources." Environmental Science and Technology 2004, pp. 160A-166A.

Grant, P.M. "Hydrogen lifts off—with a heavy load." Nature 2003, vol. 424, pp. 129-130.

Gross, R., M. Leach, A. Bauen. "Progress in renewable energy." Environment International 2003, vol. 29, pp. 105-122.

Nath, K. and D. Das. "Improvement of fermentative hydrogen production: various approaches." Applied Microbiology and Biotechnology 2004, vol. 65, pp. 520-529.

Miyake, J., M. Miyake, Y. Asada. "Biotechnological hydrogen production: research for efficient light energy conversion." Journal of Biotechnology 1999, vol. 70, pp. 89-101.

Woodward, J., M. Orr, K. Cordray, E. Greenbaum. "Enzymatic production of biohydrogen." Nature 2000, vol. 405, pp. 1014-1015.

Cheng, H., K. Scott, and C. Ramshaw. "Intensification of Water Electrolysis in a Centrifugal Field." Journal of the Electrochemical Society 2002, vol. 149, pp. D172-D177.

Logan, B.E., S. Oh, I.S. Kim, S. van Ginkel. "Biological Hydrogen Production Measured in Batch Anaerobic Respirometers." Environmental Science and Technology 2002, vol. 36, pp. 2530-2535.

Min, B. and B.E. Logan. "Continuous Electricity Generation from Domestic Wastewater and Organic Substrates in a Flat Plate Microbial Fuel Cell." Environmental Science and Technology 2004, vol. 38, pp. 5809-5814.

Logan, B.E., C. Murano, K. Scott, N.D. Gray, I.M. Head. "Electricity generation from cysteine in a microbial fuel cell." Water Research 2005, vol. 39, pp. 942-952.

Cheng, S., H. Liu, and B.E. Logan. "Optimization of Air Cathode used in One-Chamber Microbial Fuel Cells." (believed to have been offered for sale, publicly used, and/or published prior to the filing date of this application).

Angement, L.T., K, Karim, M.H. Al-Dahhan, B.A. Wrenn, and R. Dominguez-Espinosa. "Production of bioenergy and biochemicals from industrial and agricultural wastewater." TRENDS in Biotechnology 2004, vol. 22, pp. 477-485.

He, Z., S.D. Minteer, and L.T. Angenent. "Electricity Generation from Artificial Wastewater Using an Upflow Microbial Fuel Cell." Environmental Science and Technology 2005, vol. 39, pp. 5262-5267.

Zuo, Y., S. Cheng, D. Call, and B.E. Logan. "Tubular Membrane Cathodes for Scalable Power Generation in Microbial Fuel Cells." Environmental Science and Technology, pp. A-G.

Yu, E.H., Cheng, S., Scott, K., Logan, B.E., Microbial fuel performance with non-Pt cathode catalysts, J. Power Sources, 171(2):275-281 (2007).

Cheng, S., Logan, B.E., Sustainable and efficient biohydrogen production via electrohydrogenesis, PNAS, 104(47):18871-18873 (2007).

Call, D., Logan, B.E., Hydrogen production in a single chamber microbial electrolysis cell lacking a membrane, Environ. Sci. Technol., 42(9):3401-3406 (2008).

Xing, D., Zuo, Y., Cheng, S., Regan, J.M., Logan, B.E., Electricity generation by *Rhodopseudomonas palustris*, DX-1, Environ. Sci. Technol., 42: 4146-4151, 2008.

Chen, Weifang, Cannon, Fred S., Rangel-Mendez, Jose R., Ammonia-Tailoring of GAC to enhance perchlorate removal. I: Characterization of $NH_3$ thermally tailored GACs, Carbon 43 (2005) 573-580.

Chen, Weifang, Cannon, Fred S., Rangel-Mendez, Jose R., Ammonia-tailoring of GAC to enhance perchlorate removal. II: Perchlorate adsorption, Carbon 43 (2005) 581-590.

Min, B., "Perchlorate remediation using packed-bed bioreactors and electricity generation in microbial fuel cells (MFCs)," Thesis submitted to The Pennsylvania State University, The Graduate School, Department of Civil and Environmental Engineering, May 2005.

Benemann, J. et al., Novel Photobiological Hydrogen Production Process, *Proceedings of the 13th International Congress on Photosynthesis* (Montreal, Canada) 2004 Eds, Van der Est and Bruce, p. 878-880.

Rezaei, F., Substrate-Enhanced Microbial Fuel Cells for Improved Remote Power Generation from Sediment-Based Systems, *Environmental Science & Technology*, 41(11): 4053-58, 2007.

Ditzig, J., Production of hydrogen from domestic wastewater using a bioelectrically assisted microbial reactor (BEAMR), *International Journal of Hydrogen Energy*, 32: 2296-2304, 2007.

Ringeisen, B., A miniature microbial fuel cell operating with an aerobic anode chamber, *Journal of Power Sources*, 165: 591-597, 2007.

Ren, Z., Characterization of the cellulolytic and hydrogen-producing activities of six mesophilic *Clostridium* species, *Journal of Applied Microbiology*, 103: 2258-2266, 2007.

Biffinger, J., Engineering Microbial Fuels Cells: Recent Patents and New Directions, *Recent Patents on Biotechnology*, 2: 150-155, 2008.

Cord-Ruwisch, R., Growth of *Geobacter sulfurreducens* with Acetate in Syntrophic Cooperation with Hydrogen-Oxidizing Anaerobic Partners, *Applied and Environmental Microbiology*, 64(6): 2232-2236, Jun. 1998.

Ren, Z., Electricity Production from Cellulose in a Microbial Fuel Cell Using a Defined Binary Culture, *Environmental Science & Technology*, 41(13): 4781-4786, 2007.

Logan, B.E., Transport of Chemicals Present as Pure Phases, p. 399-405 in Environmental Transport Processes, John Wiley & Sons. 1999.

(56) References Cited

OTHER PUBLICATIONS

Dumas, C., et al., Marine microbial fuel cell: Use of stainless steel electrodes as anode and cathode materials, *Electrochimica Acta*, 53: 468-473, 2007.

Bergel, A., Catalysis of oxygen reduction in PEM fuel cell by seawater biofilm, *Electrochemistry Communications*, 7: 900-904, 2005.

Zuo, Y. et al., Ion Exchange Membrane Cathodes for Scalable Microbial Fuel Cells, *Environmental Science & Technology*, 42(18): 6967-6972, 2008.

Zuo, Y. et al., Tubular Membrane Cathodes for Scalable Power Generation in Microbial Fuel Cells, *Environmental Science and Technology*, 41:3347-3353, 2007.

\* cited by examiner

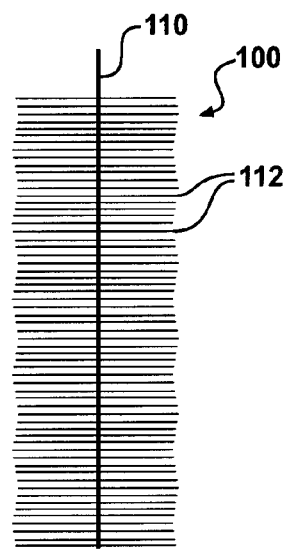 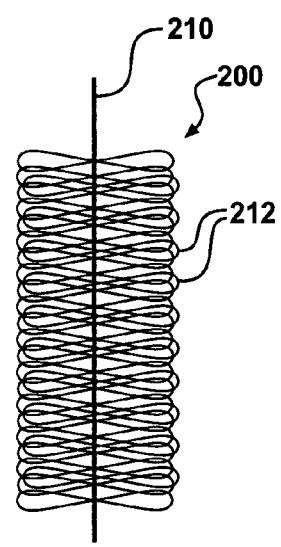 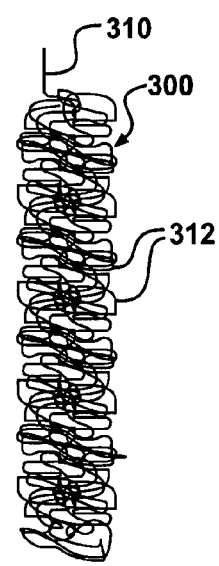
FIG - 1  FIG - 2  FIG - 3
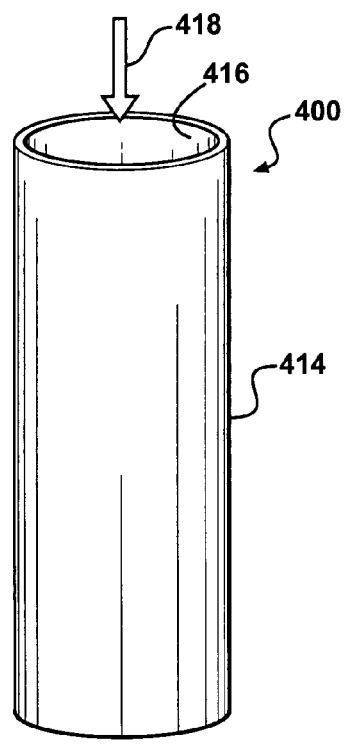 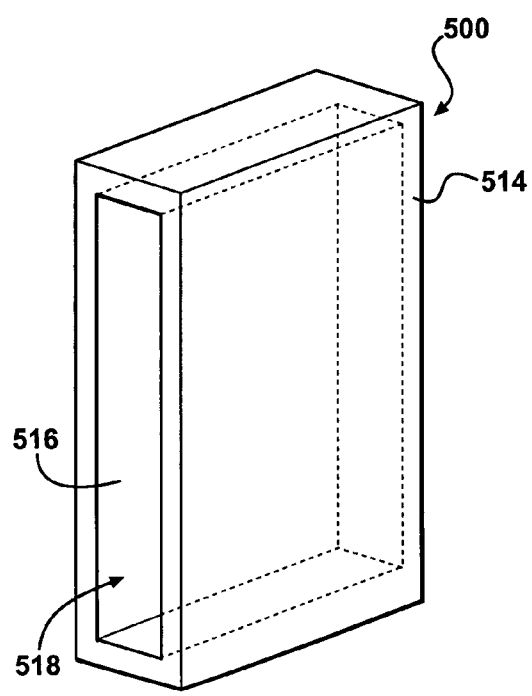
FIG - 4  FIG - 5

Table 2.

| Anode material | Cathode material | Cathode catalyst | Catalyst location | Reactor designation | $A_{an}$ (cm²) | $A_{an,s}$ (m²/m³) | $A_{cat}$ (cm²) | $A_{cat,s}$ (m²/m³) | Volume (ml) | $R_{int}$ (Ω) | $P_{max}$ (mW/m²)[a] | $P_{max}$ (W/m³) | CE (%) |
|---|---|---|---|---|---|---|---|---|---|---|---|---|---|
| Carbon paper | 2 tubes (3 cm each) | CoTMPP | Inside tube | C-T₂Co-I | 7 | 22 | 27 | 84 | 32 | 89±5 | 403±33 | 8.8±1.0 | 25-33 |
| Carbon paper | 1 tube (3 cm each) | CoTMPP | Inside tube | C-T₁Co-I | 7 | 30 | 13.5 | 59 | 23 | 131±5 | 306±8 | 9.3±0.3 | 31-40 |
| Carbon paper | 1 tube (3 cm each) | None | Inside tube | C-T₁C-I | 7 | 30 | 13.5 | 59 | 23 | 131±5 | 101±2 | 3.1±0.1 | 18-22 |
| Carbon paper | Carbon paper | Pt | Inside reactor | C-CPt-I | 7 | 25 | 7 | 25 | 28 | 84±1 | 394±3 | 9.9±0.1 | 7-19 |
| Graphite brush | 2 tubes (3 cm each) | CoTMPP | Inside tube | B-T₂Co-I | 2235 | 7700 | 27 | 93 | 29 | 66±1 | ---[b] | 17.7±0.2 | 70-74 |
| Graphite brush | 1 tube (6 cm) | CoTMPP | Outside tube | B-T₂Co-O | 2235 | 6200 | 27 | 75 | 36 | 85±8 | ---[b] | 8.2±0.2 | 52-58 |

[a]Normalized to projected surface area of planar anodes, [b]Not applicable.

Figure 24

MATERIALS AND CONFIGURATIONS FOR SCALABLE MICROBIAL FUEL CELLS

REFERENCE TO RELATED APPLICATIONS

This application claims priority of U.S. Provisional Patent Application 60/796,761, filed May 2, 2006, the entire content of which is incorporated herein by reference.

GOVERNMENT SPONSORSHIP

Research carried out in connection with this invention was supported in part by National Science Foundation grant BES-0401885 and United States Department of Agriculture grant 68-3A75-3-150. Accordingly, the United States government may have certain rights in the invention.

FIELD OF THE INVENTION

The present invention relates generally to microbial fuel cells. In particular, the present invention relates to scalable configurations of electrodes and microbial fuel cells.

BACKGROUND OF THE INVENTION

Recent research advances have led to the development of fuel cell devices which utilize bacteria as catalysts to create useful products, such as electricity and hydrogen. The bacteria oxidize a substrate, electrons produced are transferred to an anode and flow to a cathode through a conductive connection which may be further connected to a load, such as a device powered by electricity and/or hydrogen produced by the fuel cell.

However, electrode configurations for microbial fuel cells often limit power production and figure prominently in space constraints associated with fuel cells.

Thus, there is a continuing need for scalable electrodes and scalable electrode assembly configurations for microbial fuel cells.

SUMMARY OF THE INVENTION

A microbial fuel cell is provided according to the present invention which includes a cathode, the cathode including a membrane, the membrane forming a cathode wall generally enclosing and defining an interior space, the cathode wall having an internal surface adjacent the interior space and an opposed external surface, the wall extending between a first end and a second end. The shape formed by the cathode wall is generally cylindrical in particular embodiments. In further particular embodiments, the shape formed by the cathode wall is generally slab or brick-shaped. An anode is included in a microbial fuel cell which is substantially non-toxic to anodophilic bacteria. An electrically conductive connector connects the anode and the cathode.

A membrane included in the cathode is a nanofiltration membrane, an ultrafiltration membrane, or an ion exchange membrane in particular embodiments of a microbial fuel cell according to the present invention.

An included membrane is optionally an electrically conductive membrane and the membrane is in electrically conductive connection with the electrically conductive connector.

In further embodiments, a conductive material is present in contact with the internal surface or the external surface of the membrane and the conductive material is in electrically conductive connection with the electrically conductive connector.

A conductive material is optionally a carbon-based material. Graphite is a particular carbon-based conductive material in contact with the membrane in certain configurations.

Optionally, the conductive material is a carbon-based coating. In specific microbial fuel cell configuration according to the present invention, the carbon-based coating is present on at least about 50% of the internal surface or the external surface of the membrane.

A catalyst for enhancing reduction of an oxidant, particularly, oxygen, is optionally present on the internal surface or the external surface of the membrane in electricity generation configurations of microbial fuel cells according to the present invention. Suitable catalysts include metal-containing catalysts such as Pt and non-metal containing catalysts, such as CoTMPP. Combinations of catalysts are optionally included.

Further, in hydrogen generation configurations of microbial fuel cells according to the present invention, a catalyst for catalyzing a hydrogen evolution reaction is included. Suitable catalysts include metal-containing catalysts such as Pt.

An included anode has a specific surface area greater than 100 $m^2/m^3$ in particular embodiments. A particular anode type included in certain embodiments is a brush anode.

More than one anode and/or more than one cathode is included in embodiments of a microbial fuel cell according to the present invention.

A microbial fuel cell provided according to the present invention is configured to produce hydrogen and/or electricity. Where hydrogen is the desired product, a power source for enhancing an electrical potential between the anode and the cathode is included. An included power source may be any of various power sources. In a particular embodiment, a microbial fuel cell configured to produce electricity is included as a power source for hydrogen production.

In particular embodiments, a microbial fuel cell is provided which includes an anode having a specific surface area greater than 100 $m^2/m^3$. The anode is substantially non-toxic to anodophilic bacteria. A cathode is also included in the microbial fuel cell and the anode and the cathode are connected by an electrically conductive connector.

An anode included in an embodiment of a microbial fuel cell according to the present invention includes one or more electrically conductive fibers. The one or more electrically conductive fibers is attached to a conductive core support in one configuration of an anode. In particular embodiments, each individual fiber of the one or more conductive fibers is attached to the conductive core support. Alternatively, a first portion of the conductive fibers is attached to the conductive core support and a second portion of the conductive fibers is attached to the first portion of the conductive fibers and in electrical communication therewith.

In particular embodiments, at least some of the conductive fibers are carbon fibers.

More than one anode and/or more than one cathode is included in embodiments of a microbial fuel cell according to the present invention.

A power source for enhancing an electrical potential between the anode and the cathode is included in particular embodiments in order to produce hydrogen from the microbial fuel cell. In further particular embodiments, the power source is in electrical communication with the anode and the cathode. For example, an included power source is a second microbial fuel cell, the second microbial fuel cell configured to produce electricity.

A cathode for a microbial fuel cell is provided which includes a membrane, the membrane forming a cathode wall having a shape, the wall having an external surface and an internal surface, the wall having the wall defining an interior space adjacent the internal surface and an exterior adjacent the external surface, the wall extending between a first end and a second end. The membrane forming the wall is a nanofiltration membrane, an ultrafiltration membrane, or an ion exchange membrane. The membrane forming the wall is optionally an electrically conductive membrane in electrically conductive connection with the electrically conductive connector. In particular embodiments, a conductive material is in contact with the internal surface or the external surface of the membrane, the conductive material in electrically conductive connection with the electrically conductive connector. A conductive material is optionally a carbon-based material, such as graphite in particular embodiments.

Where a conductive material is present on the membrane, the conductive material is present on at least about 50% of the internal surface or the external surface of the membrane.

In particular embodiments, a catalyst for enhancement of oxygen reduction or a catalyst for enhancement of proton reduction is in direct or indirect contact with the cathode membrane. Optionally, at least one of the first or second ends of the wall is closed.

In a particular embodiment of a hydrogen producing modified microbial fuel cell, the interior space of the tube cathode is at least partially filled with a liquid.

In further embodiments, the wall of the cathode is generally cylindrical or generally slab-shaped.

An anode for a microbial fuel cell according to the present invention includes an electrically conductive material having a specific surface area greater than 100 $m^2/m^3$, the anode substantially non-toxic to anodophilic bacteria. In particular embodiments, the anode includes one or more conductive fibers. Optionally, the one or more conductive fibers is attached to a conductive core support. In particular embodiments, at least some of the conductive fibers are directly attached to the support. In further embodiments, each individual fiber of the one or more conductive fibers is directly attached to the conductive core support. Optionally, the electrically conductive material having a specific surface area greater than 100 $m^2/m^3$ includes a coating.

In a particular embodiment, the one or more fibers included in an anode according to the present invention are treated with an ammonia gas.

A system according to the present invention may be used as a method of wastewater treatment coupled to electricity generation, or as a method of renewable energy generation from non-waste products, for example. Additionally, a system according to the present invention may be used as a method of wastewater treatment coupled to hydrogen generation. Thus, wastewater is provided as a biodegradable fuel which is oxidized by bacteria in a microbial fuel cell directly or which is biodegradable to produce products oxidizable by bacteria in a microbial fuel cell.

A method for production of electricity is described according to the present invention which includes providing a microbial fuel cell including a tube cathode and/or brush anode, inoculating the microbial fuel cell with bacteria, and supplying a substrate oxidizable by bacteria; thereby producing electricity.

A method for production of electricity is described according to the present invention which includes providing a microbial fuel cell including a tube cathode and/or brush anode, inoculating the microbial fuel cell with bacteria, and supplying a substrate oxidizable by bacteria and applying an additional voltage, enhancing a potential between the anode and the cathode, thereby producing hydrogen gas.

BRIEF DESCRIPTION OF THE DRAWINGS

FIG. 1 is a schematic drawing of a brush anode;
FIG. 2 is a schematic drawing of a brush anode;
FIG. 3 is a schematic drawing of a brush anode;
FIG. 4 is a schematic drawing of a hollow generally cylindrical membrane cathode;
FIG. 5 is a schematic drawing of a hollow generally slab-shaped membrane cathode.

FIG. 24 is a table showing electrode types and surface areas used in Example 2 as well as ratios of electrode area to volume, volumes, internal resistances, maximum power density normalized to anode surface area or total reactor volume, and CEs for carbon paper and brush anode MFC batch tests.

DETAILED DESCRIPTION OF THE PREFERRED EMBODIMENTS

Figure 6:
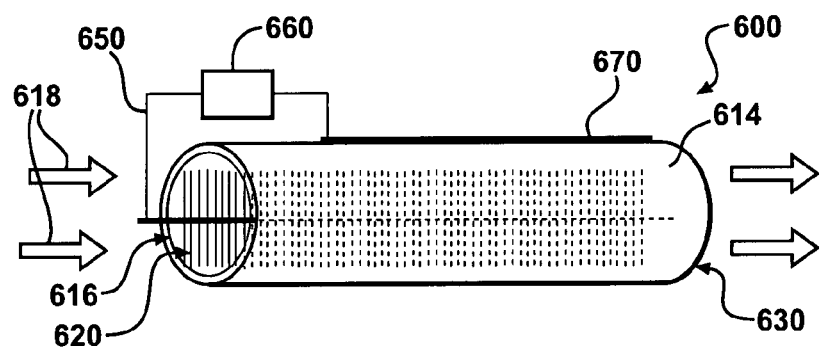
FIG. 6 is a schematic drawing of an electrode assembly for a microbial fuel cell including a brush anode disposed in a tubular cathode.

Microbial fuel cells are provided according to the present invention which include scalable electrodes and scalable electrode assembly configurations for microbial fuel cells. The term "microbial fuel cell" as used herein refers to a device using bacteria as catalysts to oxidize a fuel and generate electrons which are transferred to an anode. A microbial fuel cell typically generates electricity. The term "microbial fuel cell" is also used herein to refer to modified microbial fuel cells configured to produce hydrogen. A microbial fuel cell modified to produce hydrogen includes a power source for addition of a voltage and is distinct from a water electrolyzer. A microbial fuel cell is also known as a bio-electrochemically assisted microbial reactor (BEAMR). Broad aspects of a hydrogen generation microbial fuel cell (BEAMR) are described in U.S. patent application Ser. No. 11/180,454.

A microbial fuel cell is useful in various applications, such as in wastewater treatment, or in renewable energy production, for example. A microbial fuel cell according to the present invention may be used to power a device, such as a portable electronic device. A microbial fuel cell according to the present invention is advantageously used in a remote device, such as a marine sensor.

Broadly described, a microbial fuel cell includes bacteria as a catalyst for generation of electrons for production of electricity and/or hydrogen. A microbial fuel cell generally includes an anode, a cathode and an electron conductor connecting the anode and cathode. Bacteria capable of oxidizing a substrate to produce electrons are included in a microbial fuel cell. A cation exchange, anion exchange or neutral charge membrane is optionally included in particular configurations of a microbial fuel cell.

Broadly describing operation of a microbial fuel cell configured to produce electricity, a provided oxidizable substrate is oxidized by bacteria which generate electrons and protons. Where the substrate is an organic substrate carbon dioxide is also produced. The electrons are transferred to the anode, and, through a load such as a device to be powered, to the cathode. Protons and electrons react with oxygen at the cathode, producing water.

Broadly describing operation of a microbial fuel cell configured to produce hydrogen, a provided oxidizable substrate is oxidized by bacteria which generate electrons and protons. Where the substrate is an organic substrate carbon dioxide is also produced. A power source is connected to the microbial fuel cell and an additional voltage is applied. The electrons generated by the bacteria are transferred to the anode, and, through a conductive connector, to the cathode. Oxygen is substantially excluded from the cathode area such that protons and electrons combine at the cathode, producing hydrogen.

Electrodes included in a microbial fuel cell according to the present invention are electrically conductive. Exemplary conductive electrode materials include, but are not limited to, carbon paper, carbon cloth, carbon felt, carbon wool, carbon foam, graphite, porous graphite, graphite powder, graphite granules, graphite fiber, a conductive polymer, a conductive metal, and combinations of any of these.

Typically, an anode provides a surface for attachment and growth of anodophilic bacteria and therefore an anode is made of material compatible with bacterial growth and maintenance. Compatibility of a material with bacterial growth and maintenance in a microbial fuel cell may be assessed using standard techniques such as assay with a viability marker such as Rhodamine 123, propidium iodide, SYTO 9 and combinations of these or other bacteria viability markers.

An anode included in embodiments of a microbial fuel cell according to the present invention includes fibers of a conductive anode material, providing a large surface area for contact with bacteria in a microbial fuel cell.

Specific surface area of an anode included in embodiments of a fuel cell according to the present invention is greater than 100 $m^2/m^3$. Specific surface area is here described as the total surface area of the anode per unit of anode volume. Specific surface area greater than 100 $m^2/m^3$ contributes to power generation in microbial fuel cells according to embodiments of the present invention. In further embodiments, fuel cells according to the present invention include an anode having a specific surface area greater than 1000 $m^2/m^3$. In still further embodiments, fuel cells according to the present invention include an anode having a specific surface area greater than 5,000 $m^2/m^3$. In yet further embodiments fuel cells according to the present invention include an anode having a specific surface area greater than 10,000 $m^2/m^3$. An anode configured to have a high specific surface area allows for scaling of a microbial fuel cell according to the present invention.

A brush anode is provided in particular embodiments which has a specific surface area greater than 100 $m^2/m^3$. A brush anode includes one or more conductive fibers. In particular embodiments the one or more fibers are attached to a support.

A plurality of fibers is attached to the support and the fibers extend generally radially from the support in specific embodiments. A brush anode optionally includes a centrally disposed support having a longitudinal axis.

Brush anodes include a variety of configurations illustratively including various twisted wire brush configurations and strip brush configurations. For example, a particular twisted wire brush configuration includes a support formed from two or more strands of wire and fibers attached between the wires. In a further example, a strip brush configuration includes fibers attached to a conductive backing strip, the strip attached to the support.

Fibers of a brush anode are electrically conductive and are in electrical communication with the support and with a cathode. In particular embodiments, fibers and/or support of a brush anode provide a support for colonization by anodophilic bacteria, such that the brush anode is preferably substantially non-toxic to anodophilic bacteria.

In particular embodiments, fibers of a brush anode include a metallic and/or non-metallic conductive material which is substantially non-toxic to anodophilic bacteria. In a specific example, fibers include carbon fibers. Carbon fibers are optionally substantially composed of graphite. In a further option, a carbon material is mixed with a conductive polymer to form a fiber. In still further embodiments, a polymer fiber is coated with a conductive carbon material.

In one configuration, graphite fibers 112 of a brush anode 100 are placed substantially perpendicular to and between two or more conductive, corrosion resistant wires which form a support 110 such that the carbon fibers 112 extend substantially radially from the support 110 as shown in FIG. 1. A wire is optionally twisted around the brushes to maintain good electrical contact with the wire, forming an anode electrode. A conductive connector is typically attached to the support 110 to connect the anode to the cathode.

The graphite fibers included in a brush anode may be cut at the ends as in FIG. 1 such that multiple discontinuous fibers 112 are present in the brush anode. In further embodiments, as illustrated in FIG. 2, an anode 200 optionally includes one or more fibers in a continuous ordered configuration, for instance to help maintain fiber extension into an aqueous medium in a microbial fuel cell. In the illustrated configuration, at least one continuous fiber is wound about a central axis, forming looped fiber extensions 212. An optional support 210 is shown in FIG. 2. Where no support is included, a conductive connector is attached to the fiber or fibers to connect the anode to the cathode. Where a support is included, a conductive connector is typically attached to the support to electrically connect the anode and a cathode.

In a further configuration, a brush anode 300 includes randomly oriented graphite fibers 312 without a support forming a type of continuous pad structure in electrical conduction connection with a connector 310, shown in FIG. 3.

A brush anode electrode may include any of various coatings. In particular embodiments a coating is included on a brush anode to increase the efficiency of power production by bacteria on the anode. For example, a brush anode electrode may be coated with a material which increases the conductivity of electrons from bacteria to a surface. Examples of materials which increase the conductivity of electrons from bacteria to a surface include, but are not limited to, neutral red, $Mn^{4+}$, $Fe_3O_4$, $Ni^{2+}$, fluorinated polyanilines, such as poly(2-fluoroaniline) and poly(2,3,5,6-tetrafluoroaniline) for example, anthraquinone-1,6-disolfonic acid (AQDS), 1,4-naphthoquinone (NQ), and combinations of any of these.

In a particular embodiment, an anode is treated with an ammonia gas process to increase power production and reduce the time needed to generate substantial power once the reactor is inoculated. For example, a brush anode is treated with a heated ammonia gas, such as $NH_3$ gas. In a specific embodiment, a brush anode is heated to 700° C. and incubated with $NH_3$ gas for about one hour.

Additional materials are optionally included in a brush anode, for example to strengthen and support the graphite fibers or to help clean the system by removing biofilm in cases where the brushes can be moved around or swirled to clean the adjoining surfaces, cathodes or other materials.

A cathode included in an inventive system may be configured to be immersed in liquid or as a gas cathode, having a surface exposed to a gas. A cathode preferably includes an electron conductive material. Materials included in a cathode included in an inventive system illustratively include, but are not limited to, carbon paper, carbon cloth, carbon felt, carbon wool, carbon foam, graphite, porous graphite, graphite powder, a conductive polymer, a conductive metal, and combinations of any of these.

In particular embodiments, a microbial fuel cell provided according to the present invention includes a cathode wherein the cathode includes a membrane and the membrane forms a cathode wall. The cathode wall has an external surface and an internal surface and the wall defines an interior space adjacent to the internal surface and an exterior adjacent to the external surface. The cathode wall forms a shape which is generally cylindrical in particular embodiments. In further particular embodiments, the shape formed by the cathode wall is generally slab or brick-shaped, having a hollow interior. Other hollow shapes are also possible, illustratively including hollow disc-shaped.

A membrane forming a cathode wall is a porous membrane. The membrane is sufficiently porous to allow diffusion of a desired material through the membrane. For example, an included membrane is porous to oxygen, protons and/or hydrogen gas in particular embodiments of an inventive microbial fuel cell. In specific embodiments of an electricity generating configuration of a microbial fuel cell, an included membrane is porous to oxygen and protons. In specific embodiments of a hydrogen generating modified microbial fuel cell, an included membrane is porous to protons where a catalyst is present on or adjacent to the internal surface of the membrane. In further specific embodiments of a hydrogen gas generating modified microbial fuel cell, an included membrane is porous to protons and hydrogen gas where a catalyst is present on or adjacent to the external surface of the membrane. In preferred embodiments, the effective pores of an included membrane are smaller than the size of a typical bacterium, about 1000 nanometers. Thus, the flow of water and/or bacteria through the membrane and any included membrane coatings is restricted.

A membrane included in a cathode of the present invention is not limited as to the material included in the membrane. Microfiltration, nanofiltration and ion exchange membrane compositions are known in the art and any of various membranes may be used which exclude bacteria and allow diffusion of a desired gas through the membrane. Illustrative examples of microfiltration, nanofiltration and/or ion exchange membrane compositions include, but are not limited to, halogenated compounds such as tetrafluoroethylene, tetrafluoroethylene copolymers, tetrafluoroethylene-perfluoroalkylvinylether copolymers, polyvinylidene fluoride, polyvinylidene fluoride copolymers, polyvinyl chloride, polyvinyl chloride copolymers; polyolefins such as polyethylene, polypropylene and polybutene; polyamides such as nylons; sulfones such as polysulfones and polyether sulfones; nitrile-based polymers such as acrylonitriles; and styrene-based polymers such as polystyrenes.

A membrane optionally include a structural support layer such as a porous plastic backing layer. For example, a membrane is optionally supported on a polyester layer. A support layer is flexible in preferred embodiments.

Examples of suitable membrane materials are ultrafiltration and nanofiltration membranes commonly employed in the water treatment industry to filter water while excluding bacteria. For example, a suitable membrane is ultrafiltration membrane B 0125 made by X-Flow, The Netherlands. Additional examples include CMI and AMI ion exchange membranes made by Membranes International, Inc. New Jersey, USA.

A membrane included in an inventive cathode includes a conductive material such that the membrane is electrically conductive and/or the membrane is coated on one side with a conductive material.

In particular configurations, one or more coatings are applied to the membrane in order to allow the material to become electrically conductive. For example, a metal or carbon containing coating is optionally applied to at least a portion of one side of the membrane. In a particular embodiment, a graphite coating is applied. An exemplary formulation of a graphite coating includes products of Superior Graphite, formulations ELC E34, Surecoat 1530.

Optionally, a membrane material is fabricated to include an electrically conductive material in the membrane, rendering a membrane made from the material electrically conductive. For example, carbon fibers may be mixed with a polymer typically used in an ultrafiltration, nanofiltration and/or ion exchange membrane.

Optionally, a catalyst for enhancing a desired reaction at the cathode is included in a cathode according to the present invention. Thus, a catalyst for enhancing reduction of oxygen is included in an electricity producing configuration of a microbial fuel cell. Further, a catalyst for enhancing reduction of protons to hydrogen gas, that is enhancing a hydrogen evolution reaction, is included in a hydrogen gas producing configuration of a microbial fuel cell. An included catalyst typically enhances the reaction kinetics, e.g. increases the rate of oxygen and/or proton reduction. In addition, a catalyst reduces a need for applied potential, the overpotential, for initiating oxygen and/or hydrogen reduction.

A catalyst is optionally applied to a conductive membrane. In a further option, a catalyst is mixed with a conductive material to form a mixture which is applied to a membrane. In a further option, a catalyst is applied to the membrane before or after application of a conductive material.

In particular embodiments, a catalyst is optionally mixed with a polymer and a conductive material such that a membrane includes a conductive catalyst material integral with the membrane. For example, a catalyst, is mixed with a graphite coating material and the mixture is applied to a cathode membrane.

Suitable catalysts are known in the art and include metal catalysts, such as a noble metal. Suitable catalyst metals illustratively include platinum, nickel, copper, tin, iron, palladium, cobalt, tungsten, and alloys of such metals. While a catalyst metal such as platinum is included in a cathode in one embodiment of an inventive system, the platinum content may be reduced, for example to as little as 0.1 mg/cm$^2$ without affecting energy production. In further embodiments, an included catalyst includes a non-noble metal containing catalyst such as CoTMPP.

One or more additional coatings may be placed on one or more electrode surfaces. Such additional coatings may be added to act as diffusion layers, for example. A cathode protective layer, for instance, may be added to prevent contact of bacteria or other materials with the cathode surface while allowing oxygen diffusion to the catalyst and conductive matrix. In further embodiments, a cathode protective layer is included as a support for bacterial colonization such that bacteria scavenge oxygen in the vicinity of the cathode but do not directly contact the cathode.

FIG. 4 illustrates a generally cylindrical "tube" cathode 400 according to the present invention having a cathode wall which has an external surface 414 and an internal surface 416 and the wall defines an interior space 418 adjacent to the internal surface 416.

FIG. 5 illustrates a generally slab-shaped "tube" cathode 500 according to the present invention having a cathode wall which has an external surface 514 and an internal surface 516 and the wall defines an interior space 518 adjacent to the internal surface 516.

A tube cathode included in a microbial fuel cell configured for electricity generation is open at one or both ends of its length to an oxygen-containing medium. In particular embodiments, a tube cathode included in a microbial fuel cell configured for electricity generation is open at one or both ends to ambient air.

A tube cathode included in a microbial fuel cell configured for hydrogen generation according to embodiments of the present invention is open at one end of its length to a receptacle or conduit for collection or passage of generated hydrogen gas.

As described above, a tube cathode according to the present invention has an interior space. The interior space of a tube cathode included in a microbial fuel cell configured for hydrogen generation according to embodiments of the present invention may be gas filled in one option. Thus, for example, the interior space of a tube cathode may initially contain ambient air at start-up and contain increased amounts of hydrogen as hydrogen generation proceeds during operation of the hydrogen generating microbial fuel cell. The generated hydrogen flows from the interior space of the tube cathode, for instance to a gas collection unit or device. In a further embodiment, the interior space is filled or partially filled with a liquid. Hydrogen generated during operation of the hydrogen generating microbial fuel cell moves from the liquid containing interior space, for instance to a gas collection unit or device, efficiently with little back pressure into the liquid in the interior space. The inclusion of a liquid in a tube cathode aids in hydrogen evolution since it results in phase separation of the hydrogen gas and liquid, reducing back diffusion into the anode chamber. Larger amounts of hydrogen are recovered using a liquid in the cathode interior space. A liquid included in the interior space may be any of various liquids compatible with the cathode materials and with hydrogen gas. Suitable liquids include aqueous liquids, such as water, which may contain one or more salts, buffers, or other additives.

In some embodiments, the cathode is operated so that water is pulled through the porous membrane material of the cathode, allowing contact of the water with the conductive coating or conductive matrix of the membrane. The membrane material can be enriched with carbon black to make it conductive, made with graphite fibers, or coated in a way that still permits water flow through the device.

Optionally, and preferably in some embodiments, the cathode is a gas cathode. In particular embodiments, an included cathode has a planar morphology, such as when used with a brush anode electrode. In this configuration, the cathode is preferably a gas diffusion electrode.

Optionally, an included cathode is disposed in an aqueous medium, with dissolved oxygen in the medium serving to react at the cathode.

In one embodiment of the invention a cathode membrane is substantially impermeable to water.

In particular embodiments, the cathode contains one or more cathode shielding materials. Such a shielding material may preferably include a layer of a shielding material disposed on any cathode surface, including an inner cathode surface, that is, a cathode surface present in the interior volume of the reaction chamber, and an outer surface, that is, a cathode surface exterior to the reaction chamber. A cathode surface exterior to the reaction chamber is likely to be present where a gas cathode is used, where the exterior cathode surface is in contact with a gas. Thus, in one embodiment an outer surface of a cathode is covered partially or preferably wholly by a cathode diffusion layer (CDL). The CDL may be directly exposed to the gas phase and is preferably bonded to the cathode to prevent water leakage through the cathode from the interior of the reaction chamber. Further, in hydrogen generation configurations, the CDL is hydrogen permeable, allowing hydrogen to freely diffuse from the catalyst in the cathode into a gas collection chamber, gas conduit or other component of a gas collection system. A CDL may further provide support for the cathode and may further form a portion of a wall of a reaction chamber. A CDL can also help to reduce bacteria from reaching the cathode and fouling the surface. A CDL includes a hydrogen permeable hydrophobic polymer material such as polytetrafluoroethylene (PTFE) or like materials. The thickness of this material can be varied or multiple layers can be applied depending on the need to reduce water leakage.

In a further embodiment, an inner cathode surface is protected by a cathode protection layer (CPL). A function of the CPL is to protect the cathode from biofouling of the catalyst. Further, a CPL reduces diffusion of carbon dioxide to the cathode so as to limit methane formation from both abiotic and biotic sources, or from the action of bacteria, at the cathode. A CPL further acts to provide a support for bacterial colonization in the vicinity of the cathode, allowing for scavenging of oxygen in the cathode area without biofouling.

In one embodiment, a CPL is configured such that it is in contact with an inner surface of a cathode. Thus, for instance, a CPL may be configured to cover or surround the inner surface of the cathode partially or wholly, such as by bonding of the CPL to the cathode.

In a further embodiment, a CPL is present in the interior of the reaction chamber but not in contact with the cathode. The inclusion of such a CPL defines two or more regions of such a reactor based on the presence of the CPL. The CPL can be proton, liquid, and/or gas permeable barriers, such as a filter. For example, a filter for inhibiting introduction of large particulate matter into the reactor may be positioned between the anode and cathode such that material flowing through the reaction chamber between the anode and cathode passes through the filter. Alternatively or in addition, a filter may be placed onto the cathode, restricting the passage of bacteria-sized particles to the cathode and the catalyst. Further, a filter may be positioned between an inlet channel and/or outlet channel and the interior of the reaction chamber or a portion thereof. Suitable filters may be configured to exclude particles larger than 0.01 micron-1 micron for example. A CPL may also include material that aids bacterial attachment, so that bacteria can scavenge dissolved oxygen that can leak into the system.

In one embodiment, a CPL includes a "proton diffusion layer" for selectively allowing passage of material to the vicinity of a cathode. In one embodiment, a diffusion layer includes an ion exchange material. Any suitable ion conducting material which conducts protons may be included in a proton exchange membrane. For example, a perfluorinated sulfonic acid polymer membrane may be used. In particular, a proton exchange membrane such as NAFION, that conducts protons, may be used for this purpose.

In one embodiment, a diffusion layer includes an anion exchange material. In a preferred embodiment the diffusion layer includes an anion exchange material that conducts anions, associated with protons produced by anodophilic bacteria, to the cathode, such as a quaternary amine styrene divinylbenzene copolymer. An included diffusion layer further functions to inhibit diffusion of gas to or from the cathode relative to the anode chamber. Without wishing to be bound by theory it is believed that the protons associated with the negatively charged, anionic, ion exchange groups, such as phosphate groups, specifically allow passage of negatively charged anions that contain positively charged protons but overall carry a net negative charge, and not allowing passage of positively charged ions and reducing the diffusion of hydrogen into the anode chamber. Such a diffusion layer allows for efficient conduction of protons across the barrier while inhibiting backpassage passage of hydrogen. An example of such a diffusion layer material is the anion exchange membrane AMI-7001, commercially supplied by Membranes International, Glen Rock, N.J. In addition to membrane form, the diffusion layer can also include an anion conducting material applied as a paste directly to the cathode. In a preferred embodiment, an anion exchange material can be used to contain the catalyst applied to the cathode.

Fuel Cell Configurations

Broadly described, a microbial fuel cell includes an electrode assembly including an anode, a cathode and an electrically conductive connector connecting the anode and the cathode. Further components of a microbial fuel cell may include a reaction chamber in which an anode and cathode are at least partially disposed. A reaction chamber may have one or more compartments, such as an anode compartment and a cathode compartment separated, for instance, by a cation exchange membrane. Alternatively, a reaction chamber may be a single compartment configuration. One or more channels may be included in a reaction chamber for addition and removal of various substances such as substrates for bacterial metabolism and products such as hydrogen.

The electrodes of an electrode assembly can be placed in various configurations relative to each other depending on the desired application.

In general, an anode and a cathode are place in proximity. In particular embodiments, an anode may contact a cathode, such as where one or more fibers of a brush anode contact a tube cathode having a catalyst on the inside of the tube.

In one configuration, the "brush" anode electrode is placed inside the "tubular" cathode, with continuous water flow through the interior of the tube and over the brush anode, with the cathode catalyst applied on the outside of the tube.

In an example of such an arrangement, one or more brush anode electrodes are placed inside of a tube cathode tube as shown in FIG. 6. FIG. 6 shows an embodiment of an electrode assembly 600 for a microbial fuel cell having a brush anode 620 on the inside of a tube cathode 630. The tube cathode 630 has a wall formed by a membrane having an external surface 614 and an internal surface 616. External surface 614 is coated with a conductive catalyst material (CSM). The tube cathode has an internal space defined by the membrane and adjacent to the internal surface 616 which is open to allow entry and/or directed flow of an aqueous medium. For example, flow is directed through the tube so that it flows over and around the highly conductive carbon fibers of the anode 620 to which anodophilic bacteria attach. The bacteria oxidize organic matter, releasing electrons to the anode fibers. These electrons travel through the circuit 650 placed under a load 660 such that the current can do work or be transferred for distant use as a source of power. Protons produced from the oxidation of the organic matter move in the water towards the cathode where they diffuse to the site of the conductive material on the external surface 614 of the tube cathode and if a catalyst is present, form water when combined with oxygen and electrons from the circuit. In the illustrated embodiment, electrons travel through connector 650 and cathode connection 670 to the CSM on surface 614.

In a second configuration, one or more brush electrodes are placed outside the tubular cathode. Optionally, flow of an aqueous medium is directed through a reaction chamber containing one or more brush electrodes and then over a surface of a cathode tube. A tubular cathode in such a configuration can include a catalyst layer on an outside or inside surface of the tube.

Figure 7:
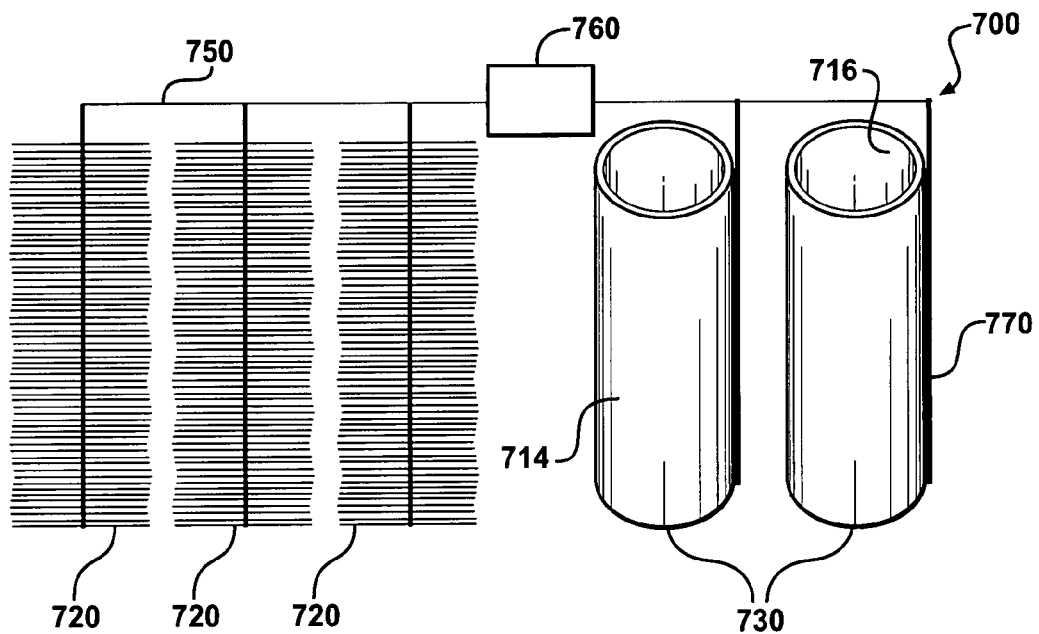
FIG. 7 is a schematic drawing of an electrode assembly for a microbial fuel cell including multiple brush anodes connected to multiple tubular cathodes.

An example of such a configuration of an electrode assembly for a microbial fuel cell in which the brush anodes are outside of the cathode in the medium is shown in FIG. 7 at 700. FIG. 7 shows multiple anodes 720 arranged in series with two tubular cathodes 730, the cathodes having a conductive catalyst material on the outside of the tube 714. Medium flow is directed through the brush electrodes and then flows on to the cathode, flowing over the cathodes allowing good transfer of protons to the cathode surface. The anode and cathode are electrically connected by an electrical connector 750 through a load 760. The electrical connector further includes a cathode connection 770 in contact with the CSM on surface 714.

An embodiment including a conductive material on the outside of the tube cathode provides good contact of the conductive cathode surface with an aqueous medium as shown in FIG. 7.

Figure 8:
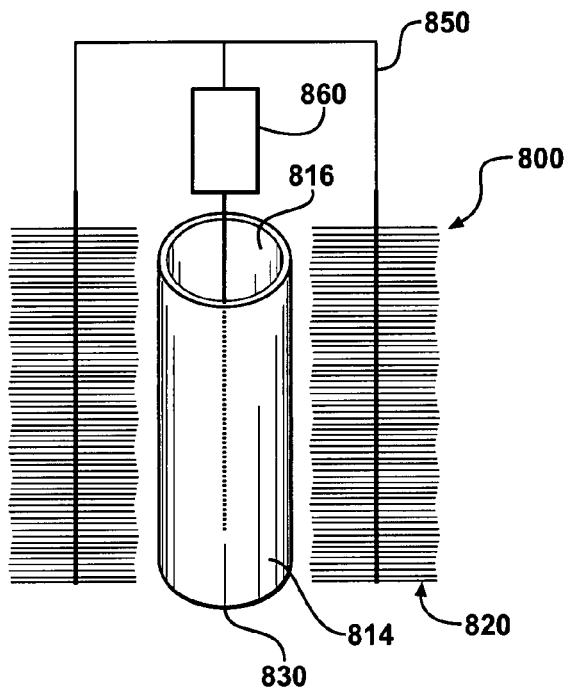
FIG. 8 is a schematic drawing of an electrode assembly for a microbial fuel cell including two brush anodes connected to a tubular cathodes.

In a further embodiment, a conductive material and catalyst is disposed on the internal surface of the tube cathode. This configuration has the benefit of keeping the conductive material away from bacteria and potential chemicals in the aqueous medium that might inactivate the catalyst or reduce its efficiency as shown in FIG. 8. FIG. 8 shows an electrode assembly 800 for a microbial fuel cell including multiple anodes 820 flanking a tube cathode 830 with a conductive catalyst material on the inside of the cathode tube, on the internal wall 816 defined by the membrane. Also shown is the external surface of the tube cathode 814, a connector 850 in electrical conduction contact with the anodes, cathode and a load 860.

Alternatively in such a configuration, the cathode tube is made of a conductive catalyst material and the outside of the tube is non-conductive, such as by coating with a non-conductive material. A cathode conductive layer can be coated with a protective layer as noted above. If the tube cathode is coated with conductive catalyst material on the internal wall, the cathode protective layer must be oxygen permeable. If the tube cathode is coated with conductive catalyst material on the external wall, the cathode protective layer must be able to pass protons from the water to the cathode surface; coatings that restrict oxygen diffusion to the water are preferred in this arrangement.

In a further configuration, a brush anode electrode is disposed external to a tube cathode lumen and the water is moved, such as by suction, into the interior of the cathode tube membrane. Optionally, the conductive catalyst material is disposed on the outside, inside, or may be integral with the membrane material. In such an arrangement, the water pulled through the cathode is filtered, as through an ultrafiltration or nanofiltration membrane.

Figure 9:
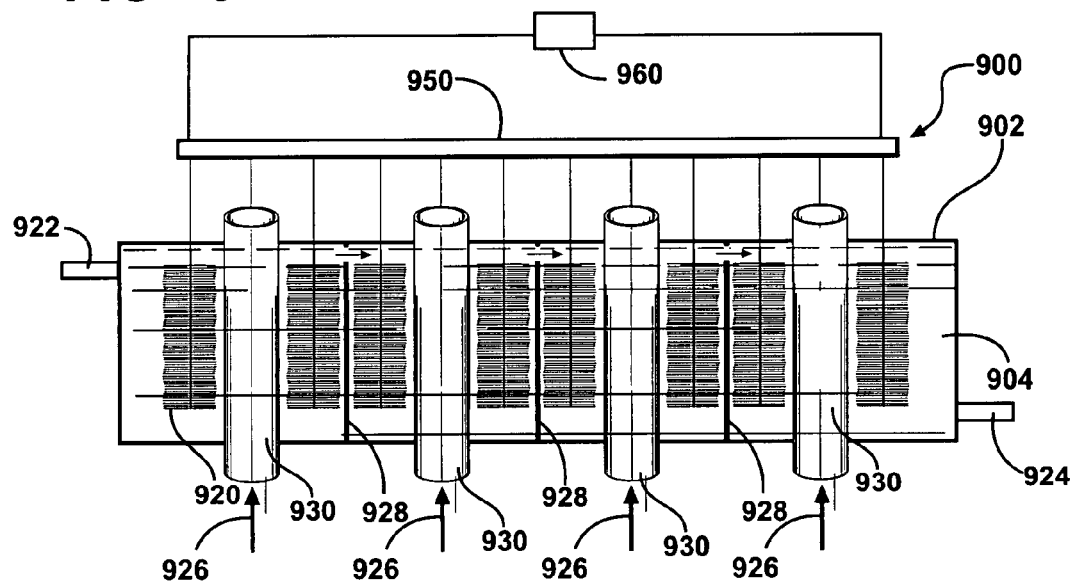
FIG. 9 is a schematic drawing of an electrode assembly for a microbial fuel cell including multiple brush anodes connected to multiple tubular cathodes.

FIG. 9 illustrates an electrode assembly 900 for a microbial fuel cell including multiple anodes 920 and cathodes 930. Shown in FIG. 9 are four anode-cathode modules such as shown in FIG. 8.

In the embodiment illustrated in FIG. 9, the electrode assembly 900 is present in a microbial fuel cell reaction chamber 902 in an aqueous medium 904 for generation of electricity. Channels 922 and 924 are illustrated, which may be used for introduction and removal of one or more substances from the reaction chamber 902. Tube cathodes 930 extend through the reaction chamber such that the interior of the tube cathodes 930 is open to the ambient atmosphere 926 and/or to a directed flow through the tubes 930. Optionally, one end of a cathode tube 930 is closed or reversibly capped. Anodes and cathodes included in the electrode assembly 900 are electrically connected by an electrical connector 950. Generated electricity may be used to power a device, illustrated as a load 960. Anode-cathode modules of an electrode assembly may be linked in series to increase voltage or in parallel to increase current. Where anode-cathode modules are linked in series, the modules are substantially separated by a baffle as shown at 928 in FIG. 9 such that the anodes are substantially electrically isolated. The illustrated baffle 928 includes a pore communicating with other reactor sections including other anode-cathode modules. Combinations of anode-cathode assemblies linked in series and in parallel may be used to increase both voltage and current.

When electricity is the main product of an inventive system, oxygen is present at the cathode to facilitate the reaction of protons, electrons and oxygen to form water. A microbial fuel cell according to the present invention may also be modified to generate hydrogen. In a hydrogen generation embodiment of a microbial fuel cell of the present invention, oxygen is substantially excluded from the cathode area and a power source for enhancing an electrical potential between the anode and cathode by application of a voltage in addition to that generated by the microbial fuel cell without the supplementary power source is included.

A system according to the present invention may be adapted to produce hydrogen gas by removing oxygen from the cathode area and by applying a small voltage of sufficient magnitude to generate hydrogen gas at the cathode surface that can be collected either inside the tube or on the outside of the tube depending on the configuration used. Broad aspects of a hydrogen generation microbial fuel cell are described in U.S. patent application Ser. No. 11/180,454.

In a hydrogen generation embodiment, an anode electrode may be constructed and placed as described. However, for the cathode no oxygen is needed and its presence is to be avoided. When oxygen is removed, a slight voltage is added to that generated at the anode. In general, the added amount is in the range between about 10-1000 millivolts. Hydrogen generated at the cathode is captured by collecting the gas produced outside the tube when an anode is placed inside the tube cathode, or by collecting the gas inside the cathode tube when an anode is placed outside the tube cathode.

A brush or planar cathode can also be used in conjunction with a brush anode for hydrogen generation. Similarly, a brush or planar anode can be used in conjunction with a tube anode for hydrogen generation. Furthermore, combinations of one or more brush and/or planar anodes may be used with one or more brush, planar and/or tube cathodes in embodiments of an inventive electrode assembly for a microbial fuel cell.

Figure 10:
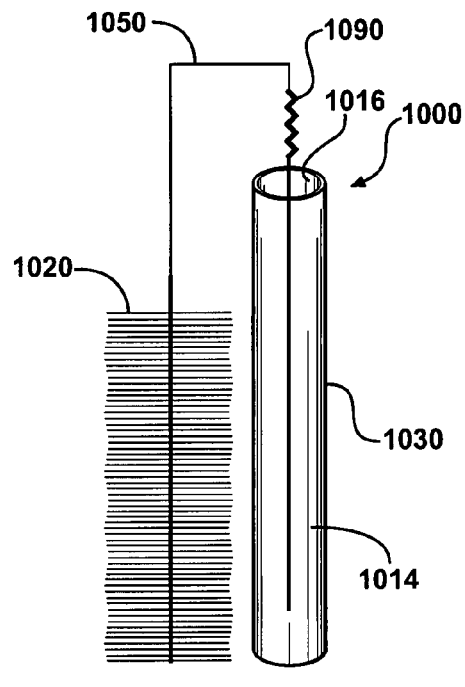
FIG. 10 is a schematic drawing of an electrode assembly for a microbial fuel cell including a brush anode and a hollow cylindrical cathode.

A particular example of a hydrogen generation anode-cathode assembly 1000 for a microbial fuel cell is shown in FIG. 10 which shows a brush anode 1020 and a cylindrical tube cathode 1030 electrically connected by a connector 1050 through a load 1090. An optional resistor 1090 is shown as the load in this figure. A power source is included in a hydrogen generation fuel cell, not shown in this figure. The tube cathode 1030 includes an external surface 1014 and an internal surface 1016.

Figure 11:
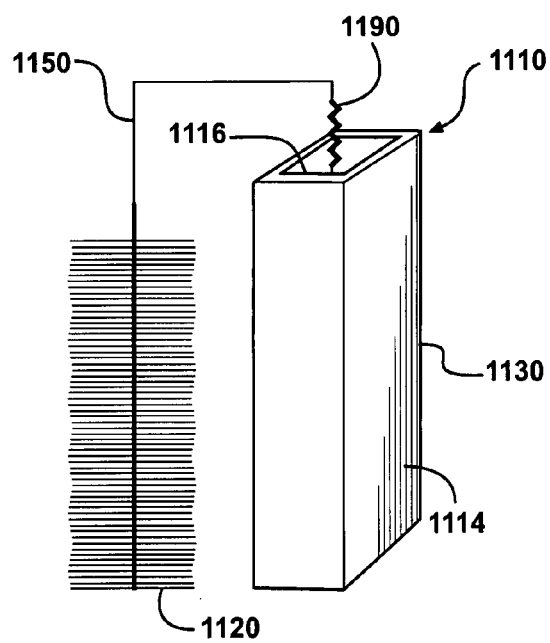
FIG. 11 is a schematic drawing of an electrode assembly for a microbial fuel cell including a brush anode and a hollow slab-shaped cathode.

A particular example of a hydrogen generation anode-cathode assembly 1110 for a microbial fuel cell is shown in FIG. 11 which shows a brush anode 1120 and a tube cathode having a slab-shape 1130 electrically connected by a connector 1150 through a load 1190. A power source is included in a hydrogen generation fuel cell, not shown in this figure, is connected to the electrode assembly. The tube cathode 1130 includes an external surface 1114 and an internal surface 1116.

Figure 12:
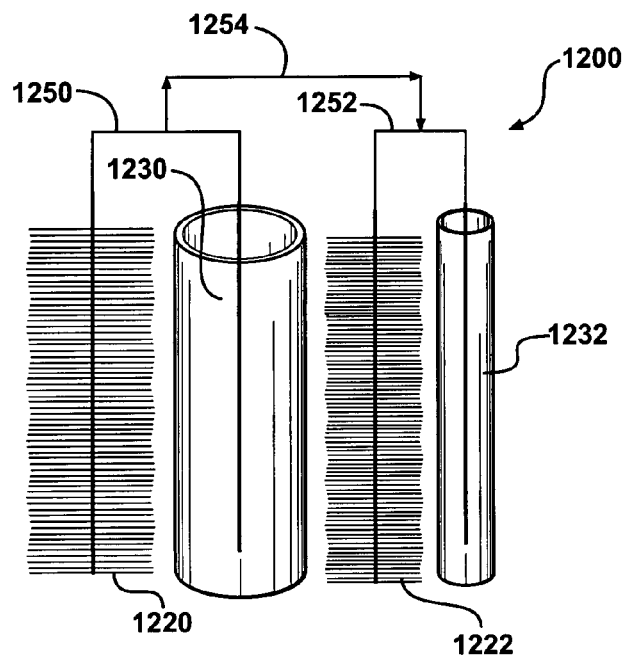
FIG. 12 is a schematic drawing of an electrode assembly for a microbial fuel cell including an electricity generating module including a brush anode and a tubular cathode powering a hydrogen generating module including a brush anode and a tubular cathode.

FIG. 12 illustrates a schematic of an electrode assembly 1200 for a microbial fuel cell in which a first electrode assembly configured to generate electricity is coupled to a second electrode assembly configured to generate hydrogen. In one such embodiment, a brush anode 1220 is electrically connected to tube cathode 1230, optionally through a load 1290. A second brush anode 1222 is electrically connected by connector 1252 to a second tube cathode 1232. The first electrode assembly is connected to the second electrode assembly by electrical connector 1254 such that the electricity produced by the first electrode assembly enhances an electrical potential between the anode 1222 and cathode 1232 by application of a voltage.

Figure 13:
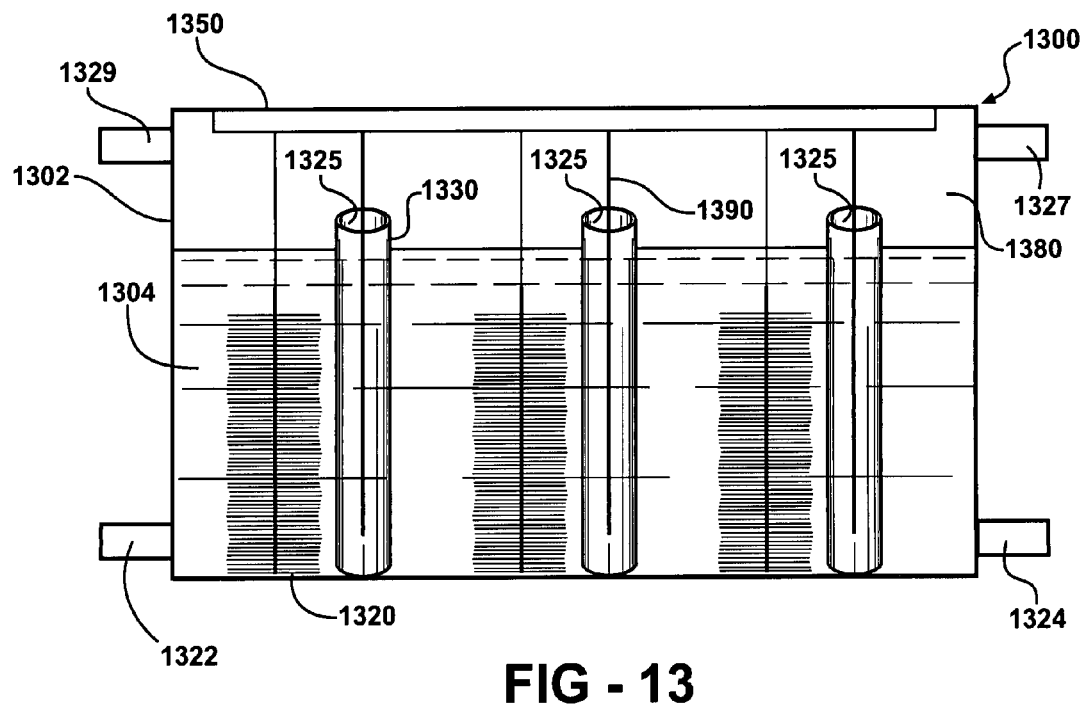
FIG. 13 is a schematic drawing of an electrode assembly for a hydrogen generating microbial fuel cell including multiple brush anodes connected to multiple cylindrical cathodes.

FIG. 13 illustrates a schematic of a microbial fuel cell 1300 for hydrogen generation including an electrode assembly having a series of electrode modules. The electrode assembly is present in a single tank reaction chamber 1302 in an aqueous medium 1304. Channels 1322 and 1324 are optionally included for ingress and egress of substances such as an aqueous medium into and out of the reaction chamber. Channels 1327 and 1329 are optionally included for ingress and egress of substances such as a sweep gas or hydrogen gas into and out of a reaction chamber and/or hydrogen collection vessel. Multiple anodes 1320 and tube cathodes 1330 are depicted and are electrically connected by connector 1350. A power source included in a hydrogen generation fuel cell, not shown in this figure, is connected to the electrode assembly. Hydrogen gas collected in the tube cathodes 1330 flows to a chamber 1380. The gas may be collected from the chamber or may be directed out of the chamber 1380 to a collection vessel or directly to a device to be hydrogen powered, for example. Tube cathodes 1330 have an interior space 1325 which is open at one end into chamber 1380. The interior space 1325 may be gas filled in one option. Thus, for example, the interior space 1325 of a tube cathode may initially contain ambient air at start-up and contain increased amounts of hydrogen as hydrogen generation proceeds during operation of the hydrogen generating microbial fuel cell 1300. In a further embodiment, the interior space 1325 is filled or partially filled with a liquid. Hydrogen generated during operation of the hydrogen generating microbial fuel cell 1300 moves from the liquid containing interior space 1325 to chamber 1380 efficiently with little back pressure into the liquid in the interior space 1325.

Figure 14:
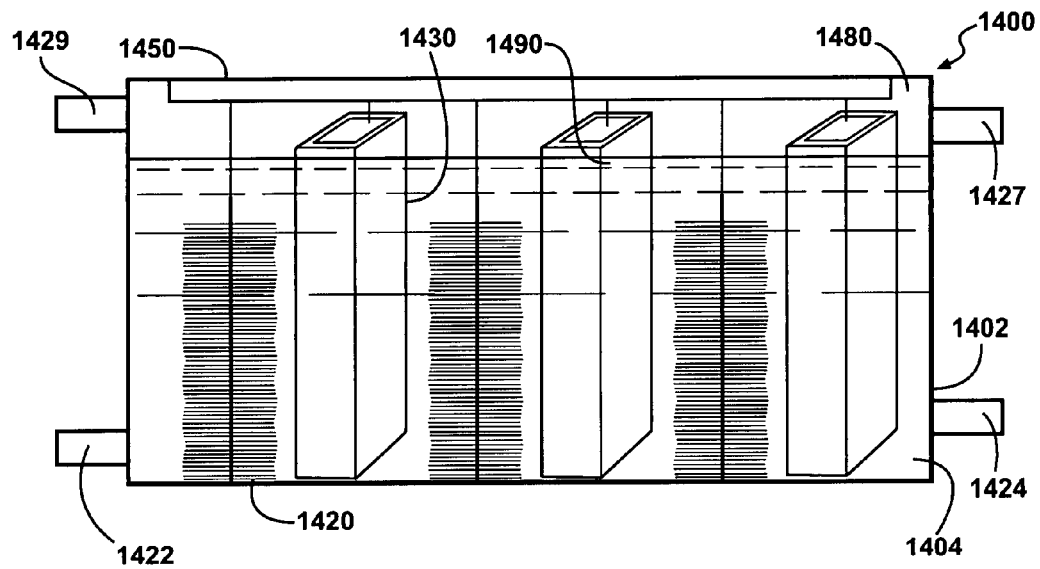
FIG. 14 is a schematic drawing of an electrode assembly for a hydrogen generating microbial fuel cell including multiple brush anodes connected to multiple slab-shaped cathodes.

FIG. 14 illustrates a schematic of a series of electrode assemblies 1400 for a microbial fuel cell for hydrogen generation. The electrodes are present in a single tank reaction chamber 1402 in an aqueous medium 1404. Channels 1422 and 1424 are optionally included for ingress and egress of substances such as an aqueous medium into and out of the reaction chamber. Channels 1427 and 1429 are optionally included for ingress and egress of substances such as a sweep gas or hydrogen gas into and out of a reaction chamber and/or hydrogen collection vessel. Multiple anodes 1420 and tube cathodes 1430 are depicted and are electrically connected by connector 1450. A power source included in a hydrogen generation fuel cell, not shown in this figure, is connected to the electrode assembly. Hydrogen gas collected in the tube cathodes 1430 flows to a chamber 1480. The gas may be collected from the chamber or may be directed out of the chamber 1480 to a collection vessel or directly to a device to be hydrogen powered, for example. The slab-shaped cathode tubes shown span the reactor depth.

An anode and cathode may have any of various shapes and dimensions and are positioned in various ways in relation to each other. In one embodiment, the anode and the cathode each have a longest dimension, and the anode and the cathode are positioned such that the longest dimension of the anode is parallel to the longest dimension of the cathode. In another option, the anode and the cathode each have a longest dimension, and the anode and the cathode are positioned such that the longest dimension of the anode is perpendicular to the longest dimension of the cathode. Further optionally, the anode and the cathode each have a longest dimension, and the anode and the cathode are positioned such that the longest dimension of the anode is perpendicular to the longest dimension of the cathode. In addition, the anode and the cathode may be positioned such that the longest dimension of the anode is at an angle in the range between 0 and 180 degrees with respect to the longest dimension of the cathode.

Electrodes of various sizes and shapes may be included in an inventive system. In general, an anode has a surface having a surface area present in the reaction chamber and the cathode has a surface having a surface area in the reaction chamber. In one embodiment, a ratio of the total surface area of anodes to surface area of cathodes in an inventive system is about 1:1. In one embodiment, the anode surface area in the reaction chamber is greater than the cathode surface area in the reaction chamber. This arrangement has numerous advantages such as lower cost where a cathode material is expensive, such as where a platinum catalyst is included. In addition, a larger anode surface is typically advantageous to provide a growth surface for anodophiles to transfer electrons to the anode. In a further preferred option a ratio of the anode surface area in the reaction chamber to the cathode surface area in the reaction chamber is in the range of 1.5:1-1000:1 and more preferably 2:1-10:1.

Electrodes may be positioned in various ways to achieve a desired spacing between the electrodes. For example, a first electrode may be positioned such that its longest dimension is substantially parallel to the longest dimension of a second electrode. In a further embodiment, a first electrode may be positioned such that its longest dimension is substantially perpendicular with respect to the longest dimension of a second electrode. Additionally, a first electrode may be positioned such that its longest dimension is at an angle between 0 and 90 degrees with respect to the longest dimension of a second electrode.

A cation exchange membrane is optionally disposed between an anode and a cathode in embodiments of a microbial fuel cell according to the present invention. A cation exchange membrane is permeable to one or more selected cations. Particularly preferred is a cation exchange membrane permeable to protons, a proton exchange membrane. Suitable proton exchange membrane materials include perfluorinated sulfonic acid polymers such as tetrafluoroethylene and perfluorovinylether sulfonic acid copolymers, and derivatives thereof. Specific examples include NAFION, such as NAFION 117, and derivatives produced by E.I. DuPont de Nemours & Co., Wilmington, Del.

A microbial fuel cell according to the present invention may be configured as a self-contained fuel cell in particular embodiments. Thus, for example, a quantity of a biodegradable substrate is included in the fuel cell and no additional substrate is added. In further options, additional substrate is added at intervals or continuously such that the fuel cell operates as a batch processor or as a continuous flow system.

Optionally, an inventive system is provided which includes more than one anode and/or more than one cathode. For example, from 1-100 additional anodes and/or cathodes may be provided. The number and placement of one or more anodes and/or one or more electrodes may be considered in the context of the particular application. For example, in a particular embodiment where a large volume of substrate is to be metabolized by microbial organisms in a reactor, a larger area of anodic surface may be provided. Similarly, a larger area of cathode surface may be appropriate. In one embodiment, an electrode surface area is provided by configuring a reactor to include one or more electrodes that project into the reaction chamber. In a further embodiment, an electrode surface area is provided by configuring the cathode as a wall of the reactor, or a portion of the wall of the reactor. The ratio of the total surface area of the one or more anodes to the total volume of the interior of the reaction chamber is in the range of about 10000:1-1:1, inclusive, square meters per cubic meter in particular embodiments. In further embodiments, the ratio is in the range of about 5000:1-100:1.

Bacteria in a microbial fuel cell include at least one or more species of anodophilic bacteria. The terms "anodophiles" and "anodophilic bacteria" as used herein refer to bacteria that transfer electrons to an electrode, either directly or by endogenously produced mediators. In general, anodophiles are obligate or facultative anaerobes. The term "exoelectrogens" is also used to describe suitable bacteria. Examples of anodophilic bacteria include bacteria selected from the families Aeromonadaceae, Alteromonadaceae, Clostridiaceae, Comamonadaceae, Desulfuromonaceae, Enterobacteriaceae, Geobacteraceae, Pasturellaceae, and Pseudomonadaceae. These and other examples of bacteria suitable for use in an inventive system are described in Bond, D. R., et al., Science 295, 483-485, 2002; Bond, D. R. et al., Appl. Environ. Microbiol. 69, 1548-1555, 2003; Rabaey, K., et al., Biotechnol. Lett. 25, 1531-1535, 2003; U.S. Pat. No. 5,976,719; Kim, H. J., et al., Enzyme Microbiol. Tech. 30, 145-152, 2002; Park, H. S., et al., Anaerobe 7, 297-306, 2001; Chauduri, S. K., et al., Nat. Biotechnol., 21:1229-1232, 2003; Park, D. H. et al., Appl. Microbiol. Biotechnol., 59:58-61, 2002; Kim, N. et al., Biotechnol. Bioeng., 70:109-114, 2000; Park, D. H. et al., Appl. Environ. Microbiol., 66, 1292-1297, 2000; Pham, C. A. et al., Enzyme Microb. Technol., 30: 145-152, 2003; and Logan, B. E., et al., Trends Microbiol., 14(12):512-518.

Anodophilic bacteria preferably are in contact with an anode for direct transfer of electrons to the anode. However, in the case of anodophilic bacteria which transfer electrons through a mediator, the bacteria may be present elsewhere in the reactor and still function to produce electrons useful in an inventive process.

Optionally, a mediator of electron transfer is included in a fuel cell. Such mediators are exemplified by ferric oxides, neutral red, anthraquinone-1,6-disulfonic acid (ADQS) and 1,4-napthoquinone (NQ). Mediators are optionally chemically bound to the anode, or the anode modified by various treatments, such as coating, to contain one or more mediators.

Anodophilic bacteria may be provided as a purified culture, enriched in anodophilic bacteria, or even enriched in a specified species of bacteria, if desired. Pure culture tests have reported Coulombic efficiencies as high as 98.6% in Bond, D. R. et al., Appl. Environ. Microbiol. 69, 1548-1555, 2003. Thus, the use of selected strains may increase overall electron recovery and hydrogen production, especially where such systems can be used under sterile conditions. Bacteria can be selected or genetically engineered that can increase Coulombic efficiencies and potentials generated at the anode.

Further, a mixed population of bacteria may be provided, including anodophilic anaerobes and other bacteria.

A biodegradable substrate included in a microbial fuel cell according to embodiments of the present invention is oxidizable by anodophilic bacteria or biodegradable to produce a material oxidizable by anodophilic bacteria.

A biodegradable substrate is an organic material biodegradable to produce an organic substrate oxidizable by anodophilic bacteria in preferred embodiments. Any of various types of biodegradable organic matter may be used as "fuel" for bacteria in a MFC, including carbohydrates, amino acids, fats, lipids and proteins, as well as animal, human, municipal, agricultural and industrial wastewaters. Naturally occurring and/or synthetic polymers illustratively including carbohydrates such as chitin and cellulose, and biodegradable plastics such as biodegradable aliphatic polyesters, biodegradable aliphatic-aromatic polyesters, biodegradable polyurethanes and biodegradable polyvinyl alcohols. Specific examples of biodegradable plastics include polyhydroxyalkanoates, polyhydroxybutyrate, polyhydroxyhexanoate, polyhydroxyvalerate, polyglycolic acid, polylactic acid, polycaprolactone, polybutylene succinate, polybutylene succinate adipate, polyethylene succinate, aliphatic-aromatic copolyesters, polyethylene terephthalate, polybutylene adipate/terephthalate and polymethylene adipate/terephthalate.

Organic substrates oxidizable by anodophilic bacteria are known in the art. Illustrative examples of an organic substrate oxidizable by anodophilic bacteria include, but are not limited to, monosaccharides, disaccharides, amino acids, straight chain or branched $C_1$-$C_7$ compounds including, but not limited to, alcohols and volatile fatty acids. In addition, organic substrates oxidizable by anodophilic bacteria include aromatic compounds such as toluene, phenol, cresol, benzoic acid, benzyl alcohol and benzaldehyde. Further organic substrates oxidizable by anodophilic bacteria are described in Lovely, D. R. et al., Applied and Environmental Microbiology 56:1858-1864, 1990. In addition, a provided substrate may be provided in a form which is oxidizable by anodophilic bacteria or biodegradable to produce an organic substrate oxidizable by anodophilic bacteria.

Specific examples of organic substrates oxidizable by anodophilic bacteria include glycerol, glucose, acetate, butyrate, ethanol, cysteine and combinations of any of these or other oxidizable organic substances.

The term "biodegradable" as used herein refers to an organic material decomposed by biological mechanisms illustratively including microbial action, heat and dissolution. Microbial action includes hydrolysis, for example.

A microbial fuel cell according to the present invention may be configured to produce electricity and/or hydrogen in particular embodiments.

An embodiment of an inventive system is a completely anaerobic system to generate hydrogen at the cathode by providing a small added voltage to the circuit. This approach to electrochemically assist hydrogen production is based on separating the two electrodes into half cell reactions. The potential of the anode is set by the oxidation of a substrate. Thus, the anode side of an embodiment of an inventive system operates similarly to that in a microbial fuel cell (MFC): bacteria oxidize an organic compound completely to $CO_2$ and transfer electrons to the anode. The half reaction potential measured at the anode in an embodiment of an inventive system tests as −480 mV (Ag/AgCl) or −285 mV (NHE) (reduction).

In contrast, cathode operation in an embodiment of an inventive anaerobic hydrogen generation system is significantly altered from that in a standard MFC. By electrochemically augmenting the cathode potential in a MFC circuit it is possible to directly produce hydrogen from protons and electrons produced by the bacteria. This approach greatly reduces the energy needed to make hydrogen directly from organic matter compared to that required for hydrogen production from water via electrolysis. In a typical MFC, the open circuit potential of the anode is ∼−300 mV. Where hydrogen is produced at the cathode, the half reactions occurring at the anode and cathode, with acetate oxidized at the anode, are:

Anode: $C_2H_4O_2 + 2H_2O \rightarrow 2CO_2 + 8e^- + 8H^+$

Cathode: $8H^+ + 8e^- \rightarrow 4H_2$

A power source for enhancing an electrical potential between the anode and cathode is included. Power sources used for enhancing an electrical potential between the anode and cathode are not limited and illustratively include grid power, solar power sources, wind power sources. Further examples of a power source suitable for use in an inventive system illustratively include a DC power source and an electrochemical cell such as a battery or capacitor.

In a particular embodiment, a power supply for a hydrogen producing microbial fuel cell is an electricity producing microbial fuel cell.

In a further embodiment, a wall of the reaction chamber includes two or more portions such as a structural portion and an electrode portion. A structural portion provides structural support for forming and maintaining the shape of the reaction chamber, as in a conventional wall. An electrode portion of a wall may provide structural support for the reaction chamber and in addition has a functional role in a process carried out in an inventive system. In such an embodiment, the structural portion and electrode portion combine to form a wall defining the interior of the reaction chamber. In a specific embodiment, the electrode portion of the wall includes the cathode. Further, a support structure for supporting an anode or cathode may be included in an electrode portion of the wall. Such a support structure may further provide structural support for forming and maintaining the shape of the reaction chamber A hydrogen gas collection system is optionally included in an inventive microbial fuel cell configured to produce hydrogen such that the hydrogen gas generated is collected and may be stored for use, or directed to a point of use, such as to a hydrogen fuel powered device.

For example, a hydrogen gas collection unit may include one or more hydrogen gas conduits for directing a flow of hydrogen gas from the cathode to a storage container or directly to a point of use. A hydrogen gas conduit is optionally connected to a source of a sweep gas. For instance, as hydrogen gas is initially produced, a sweep gas may be introduced into a hydrogen gas conduit, flowing in the direction of a storage container or point of hydrogen gas use. For instance, a hydrogen collection system may include a container for collection of hydrogen from the cathode. A collection system may further include a conduit for passage of hydrogen. The conduit and/or container may be in gas flow communication with a channel provided for outflow of hydrogen gas from the reaction chamber. Typically, the conduit and/or container are in gas flow communication with the cathode, particularly where the cathode is a gas cathode.

An aqueous medium in a reaction chamber of a microbial fuel cell is formulated to be non-toxic to bacteria in contact with the aqueous medium in the fuel cell. Further, the medium or solvent may be adjusted to a be compatible with bacterial metabolism, for instance by adjusting pH to be in the range between about pH 3-9, preferably about 5-8.5, inclusive, by adding a buffer to the medium or solvent if necessary, and by adjusting the osmolarity of the medium or solvent by dilution or addition of a osmotically active substance. Ionic strength may be adjusted by dilution or addition of a salt for instance. Further, nutrients, cofactors, vitamins and other such additives may be included to maintain a healthy bacterial population, if desired, see for example examples of such additives described in Lovley and Phillips, Appl. Environ. Microbiol., 54(6):1472-1480. Optionally, an aqueous medium in contact with anodophilic bacteria contains a dissolved substrate oxidizable by the bacteria.

In operation, reaction conditions include variable such as pH, temperature, osmolarity, and ionic strength of the medium in the reactor. In general, the pH of the medium in the reactor is between 3-9, inclusive, and preferably between 5-8.5 inclusive.

Reaction temperatures are typically in the range of about 10-40° C. for non-thermophilic bacteria, although the device may be used at any temperature in the range of 0 to 100 deg C. by including suitable bacteria for growing at selected temperatures. However, maintaining a reaction temperature above ambient temperature may require energy input and it is preferred to maintain the reactor temperature at about 15-25° C. without input of energy. A surprising finding of the present invention is that reaction temperatures in the range of 16-25° C., inclusive or more preferably temperatures in the range of 18-24° C., inclusive and further preferably in the range of 19-22° C., inclusive, allow hydrogen generation, electrode potentials, Coulombic efficiencies and energy recoveries comparable to reactions run at 32° C. which is generally believed to be an optimal temperature for anaerobic growth and metabolism, including oxidation of an organic material.

Ionic strength of a medium in a reactor is preferably in the range of 50-500 millimolar, more preferably in the range of 75-450 millimolar inclusive, and further preferably in the range of 100-400 millimolar, inclusive.

A channel is included defining a passage from the exterior of the reaction chamber to the interior in particular embodiments. More than one channel may be included to allow and/or regulate flow of materials into and out of the reaction chamber. For example, a channel may be included to allow for outflow of a gas generated at the cathode. Further, a channel may be included to allow for outflow of a gas generated at the anode.

In a particular embodiment of a continuous flow configuration, a channel may be included to allow flow of a substance into a reaction chamber and a separate channel may be used to allow outflow of a substance from the reaction chamber. More than one channel may be included for use in any inflow or outflow function.

A regulator device, such as a valve, may be included to further regulate flow of materials into and out of the reaction chamber. Further, a cap or seal is optionally used to close a channel. For example, where a fuel cell is operated remotely or as a single use device such that no additional materials are added, a cap or seal is optionally used to close a channel.

A pump may be provided for enhancing flow of liquid or gas into and/or out of a reaction chamber.

Embodiments of inventive compositions and methods are illustrated in the following examples. These examples are provided for illustrative purposes and are not considered limitations on the scope of inventive compositions and methods.

EXAMPLES

Example 1

Electrode Materials

In this example brush anodes are made of carbon fibers (PANEX®33 160K, ZOLTEK) cut to a set length and wound using an industrial brush manufacturing system into a twisted core consisting of two titanium wires. Two brush sizes are used in this example: a small brush 2.5 cm in outer diameter and 2.5 cm in length; and a larger brush 5 cm in diameter and 7 cm in length. Based on mass of fibers used in a single brush, and an average fiber diameter of 7.2 microns, these anodes are estimated to have a surface area of $0.22 \text{ m}^2$ or $18,200 \text{ m}^2/\text{m}^3$-brush volume for the small brush (95% porosity), and $1.06 \text{ m}^2$ or $7170 \text{ m}^2/\text{m}^3$-brush volume for the larger brush (98% porosity).

Except as noted, brush anodes are treated using ammonia gas as described in Cheng, S.; Logan, B. E. Ammonia treatment of carbon cloth anodes to enhance power generation of microbial fuel cells. *Electrochem. Commun.* 2007, 9, 492-496. Briefly described, ammonia gas treatment of an anode is accomplished using a thermogravimetric analyzer in this example. Any furnace that allows for temperature control may be used for ammonia gas treatment of an anode. The furnace temperature is ramped up to 700° C. at 50° C./min using nitrogen gas (70 mL/min) before switching the gas feed to 5% $NH_3$ in helium gas. The anode is held at 700° C. for 60 min. before being cooled to room temperature under nitrogen gas (70 mL/min) over 120 min.

In some tests plain Toray carbon paper anodes, untreated and non-wet proofed, E-TEK, having a projected area of 23 $cm^2$, both sides, are used for comparisons to brush anodes.

Random bundles of ammonia-treated graphite fibers are also used in some tests, consisting of one to four tows of fibers with each cut to a fixed length of 10 cm. The mass of each tow was ~0.1 g, with a projected surface area calculated as $0.020 \text{ m}^2$ per tow for 10 micron diameter fibers (Granoc-Nippon) and $0.035 \text{ m}^2$ per tow for the 6 micron diameter (#292 Carbon Fiber Tow, Fibre Glast, Ohio).

The cathodes are made by applying platinum (0.5 mg/$cm^2$ Pt) and four diffusion layers on a 30 wt % wet-proofed carbon cloth (type B-1B, E-TEK) as described in Cheng, S. et al., Electrochem. Commun. 2006, 8, 489-494. In some experiments, the cathodes are prepared using the same method and additionally containing 40% cobalt tetramethylphenylporphyrin (CoTMPP, 1.2 mg/$cm^2$) as the catalyst instead of Pt.

MFC Reactors

Two types of single-chambered MFCs are used to examine power production using brush electrodes in this example: cube-shaped MFCs (C-MFCs) which are designed to maximize power production; and bottle-type MFCs containing a single side port (B-MFC) that are created for examining power production by pure and mixed cultures in an easily produced and inexpensive system. C-MFCs are constructed as described in Liu, H.; Logan, B. E. Electricity generation using an air-cathode single chamber microbial fuel cell in the presence and absence of a proton exchange membrane. *Environ. Sci. Technol.* 2004, 38, 4040-4046 except the anode that normally rested against the closed end of the reactor is replaced by a small brush electrode positioned in a concentric manner the core of the cylindrical anode chamber. The brush end is fixed in the chamber (4 cm long by 3 cm in diameter; liquid volume of 26 ml) so that the end is 1 cm from the cathode (3.8 cm diameter, 7 $cm^2$ total exposed surface area). The metal end of the brush protrudes through a hole drilled in the reactor that is sealed with epoxy (Quick Set™ Epoxy, LOCTITE). CoTMPP is used as the catalyst in all C-MFC tests in this example.

B-MFCs are made from common laboratory media bottles (320 mL capacity, Corning Inc. NY), and are autoclavable even when fully assembled. A large brush electrode is suspended in the middle of the bottle containing 300 mL of medium, with the top of the brush ~6 cm from the bottle lid. The wire from the bush is placed through the lid hole and sealed with epoxy. In tests using carbon paper anodes (2.5 cm by 4.5 cm, 22.5 $cm^2$ total), the electrodes are placed ~6 cm from the bottle lid and connected to a titanium (99.8% pure) wire through a hole in the lid that is sealed with epoxy. The 4-cm long side tube is set 5 cm from the reactor bottom, with a 3.8 cm-diameter cathode held in place at the end by a clamp between the tube and a separate single tube 4 cm long, providing a total projected cathode surface area of 4.9 $cm^2$ (one side of the cathode). In tests using random bundles of fibers as the anode, the fibers are held by a pinch clamp connected to a wire that is passed through a hole in the lid and sealed with epoxy.

Reactor Inoculation.

C-MFCs are inoculated using pre-acclimated bacteria from another MFC (originally inoculated with primary clarifier overflow) that had been running in fed batch mode for over 6 months. The reactor is fed a medium containing 1 g/L of acetate in 50 mM phosphate buffer solution (PBS; $Na_2HPO_4$, 4.09 g/L and $NaH_2PO_4.H_2O$, 2.93 g/L) or 200 mM PBS, $NH_4Cl$ (0.31 g/L) and KCl (0.13 g/L), and metal salt (12.5 mL/L) and vitamin (5 mL) solutions as described in Lovley, D. R.; Phillips, E. J. P. Novel mode of microbial energy metabolism: organic carbon oxidation coupled to dissimilatory reduction of iron or manganese. *Appl. Environ. Microbiol.* 1988, 54, 1472-1480. Feed solutions are replaced when the voltage dropped below 20 mV, forming one complete cycle of operation. C-MFCs are operated in a temperature controlled room at 30° C.

B-MFCs are inoculated using fresh primary clarifier overflow (unless stated otherwise) in a 1 g/L glucose medium prepared as described above with 50 or 200 mM PBS. In one separate set of tests the reactor is inoculated with the same pre-acclimated bacterial solution used to inoculate the C-MFCs. All B-MFCs are operated on laboratory bench tops at ambient temperatures of 23±3° C.

Analyses.

The voltage (V) across an external resistor (1000Ω except as noted) in the MFC circuit is monitored at 30 min intervals using a multimeter (Keithley Instruments, OH) connected to a personal computer. Current (I), power (P=IV) and coulombic efficiency (CE) are calculated as described in Kim, J. R. et al., *Appl. Microbiol. Biotechnol.* 2005, 68, 23-30, with the power density normalized by the projected surface area of one side of the cathode, and volumetric power density normalized by the volume of the liquid media. Internal resistance, $R_{int}$, is measured using electrochemical impedance spectroscopy (EIS) with a potentiostat (PC 4/750, Gamry Instrument Inc., PA), with the anode chamber filled with PBS and substrate. Impedance measurements were conducted at the open circuit voltage (OCV) over a frequency range of $10^5$ to 0.005 Hz with sinusoidal perturbation of 10 mV amplitude as described in Cheng, S. et al., *Environ. Sci. Technol.* 2006, 40, 2426-2432. Polarization curves are obtained by measuring the stable voltage generated at various external resistances and then used to evaluate the maximum power density as described in Logan, B. E. et al., *Environ. Sci. Technol.* 2006, 40, 5181-5192. The C-MFCs are run for at least two complete operation cycles at each external resistance, where each cycle takes ~2 days. The B-MFCs require much longer cycle times (~21 days), and therefore polarization data are taken after 15 min at each external resistance at the beginning of a single operation cycle. The internal resistance, defined as the sum of all ohmic resistances including electrolyte and contact resistances, for both C- and B-MFCs was determined using Nyquist plots of the impedance spectra from the real impedance $Z_{re}$ where it intersects the X-axis (imaginary impedance $Z_{im}=0$) as described in He, Z. et al., *Environ. Sci. Technol.* 2006, 40, 5212-5217; Cai, M. et al., *Environ. Sci. Technol.* 2004, 38, 3195-3202; Raz, S. et al., *Solid State Ionics* 2002, 149, 335-341; and Cooper, K. R. et al., *J. Power Sources* 2006, 160, 1088-1095.

Power Production Using C-MFCs.

Figure 15:
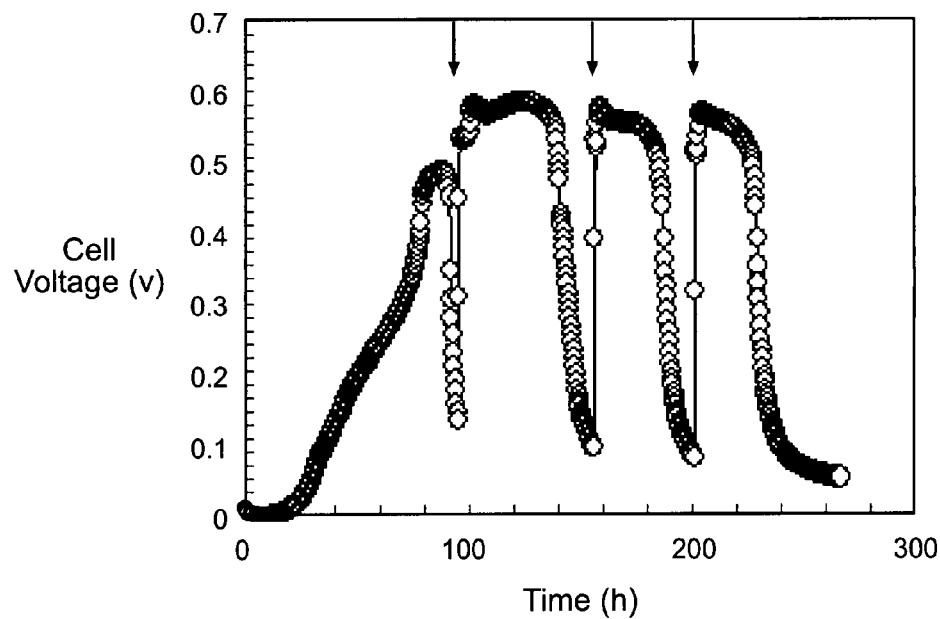
FIG. 15 is a graph showing the initial four cycles of power production in a microbial fuel cell including a brush anode.

Voltage generation cycles of C-MFCs with brush anodes were reproducible after 4 feeding cycles with fresh media, producing a maximum voltage of 0.57 V and a CE=41% with the 1000Ω resistor. FIG. 15 shows the initial four cycles of power production in a C-MFC with a brush anode, including 50 mM PBS and a 1000Ω resistor; arrows in the figure indicate when the reactor was fed fresh medium.

Figure 16A:
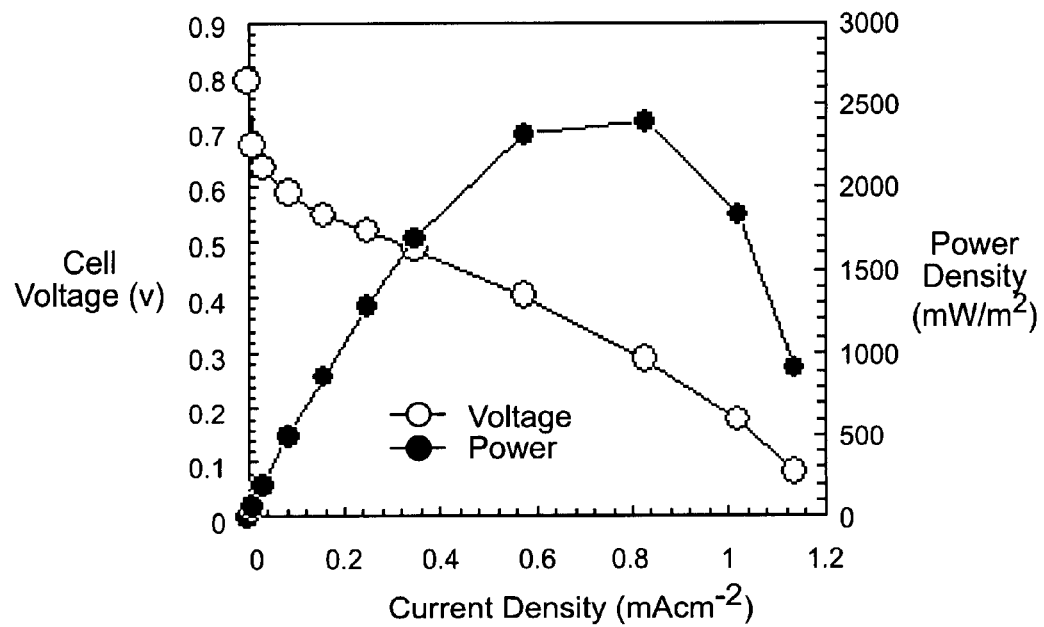
FIG. 16A is a graph showing power density and cell potentials in a microbial fuel cell including a brush anode.
Figure 16B:
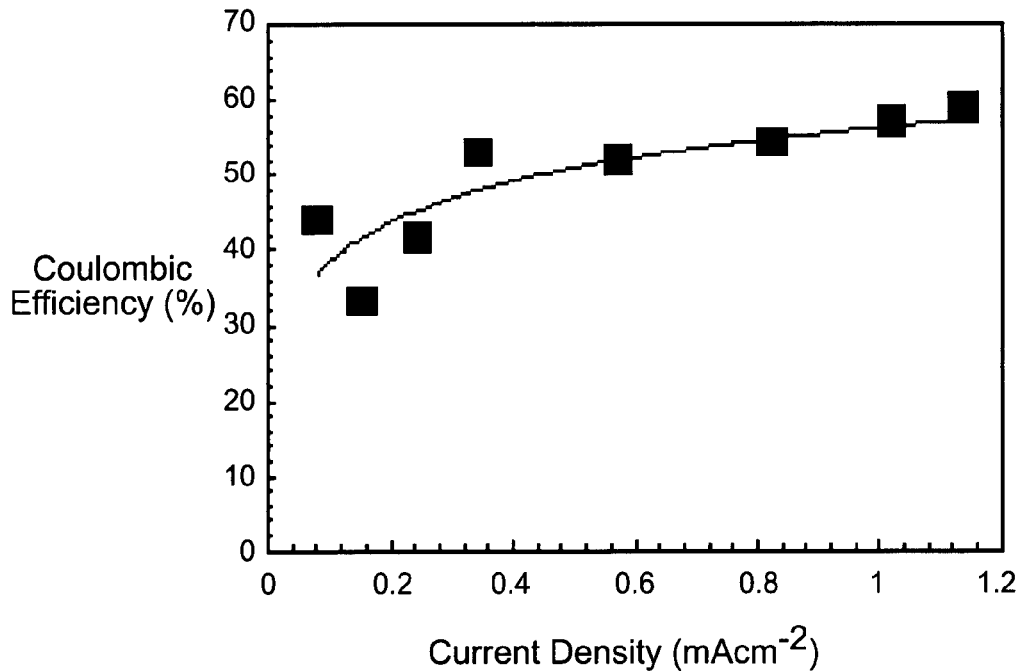
FIG. 16B is a graph showing coulombic efficiency in a microbial fuel cell including a brush anode.

Based on polarization data, the maximum power produced in this fuel cell was 2400 mW/m² at a current density of 0.82 mA/cm² ($R_{ext}$=50Ω), or 73 W/m³ when power was normalized by the reactor liquid volume, illustrated in FIG. 16A. CEs ranged from 40-60% depending on the current density as shown in FIG. 16.

Figure 17:
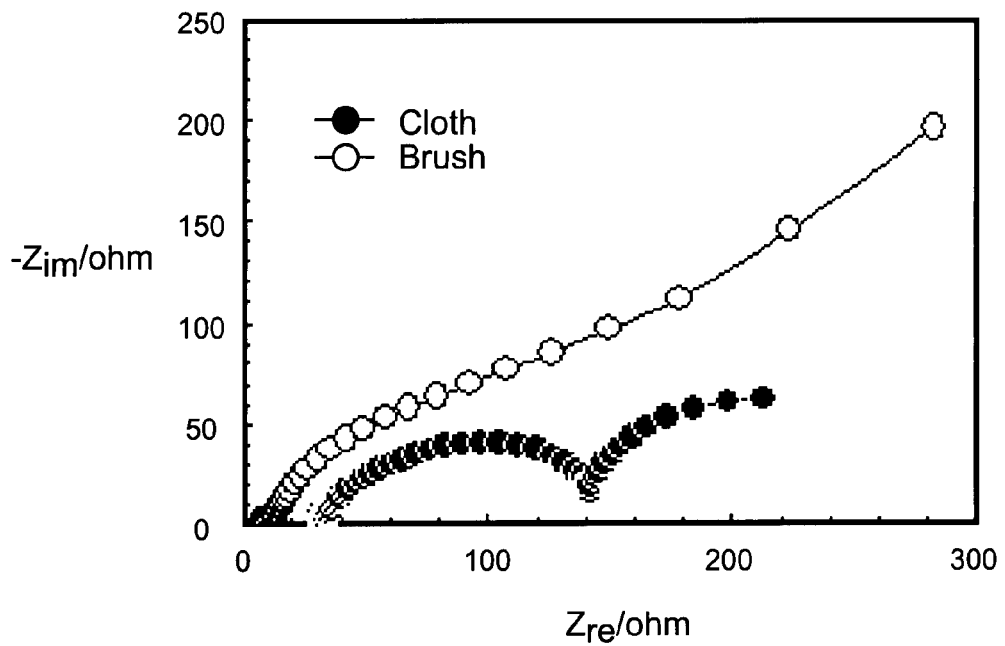
FIG. 17 is a graph showing Nyquist plots corresponding to the impedance spectra of microbial fuel cells including either a cloth or brush anode, measured between the cathode and anode.

The internal resistance was $R_{int}$=8Ω for the brush C-MFC (200 mM PBS), versus $R_{int}$=31Ω for a carbon cloth C-MFC (200 mM PBS, 4 cm electrode spacing) as shown in FIG. 17 and Table 1. FIG. 17 shows Nyquist plots corresponding to the impedance spectra of the C-MFCs measured between the cathode and anode (two-electrode mode) in 200 mM PBS. The MFC was discharged to 0.57 V at 1000Ω and the external circuit had been disconnected for 2 hours. The internal resistance is obtained as the value of the x-intercept.

Power Production Using B-MFCs.

Figure 18A:
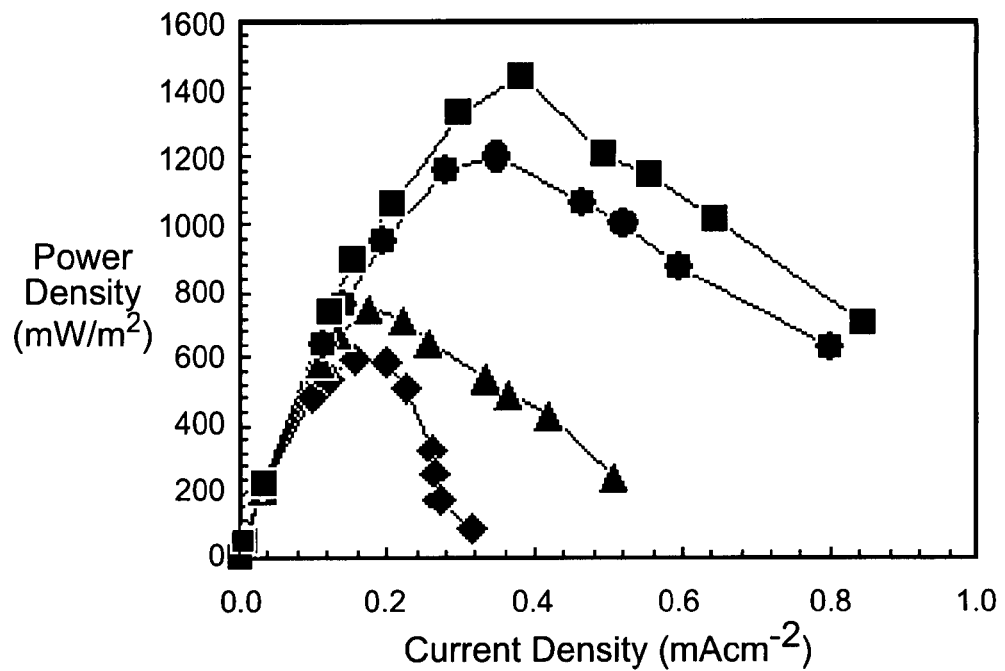
FIG. 18A is a graph showing power density curves for microbial fuel cells containing various types of anodes in 200 mM PBS.
Figure 18B:
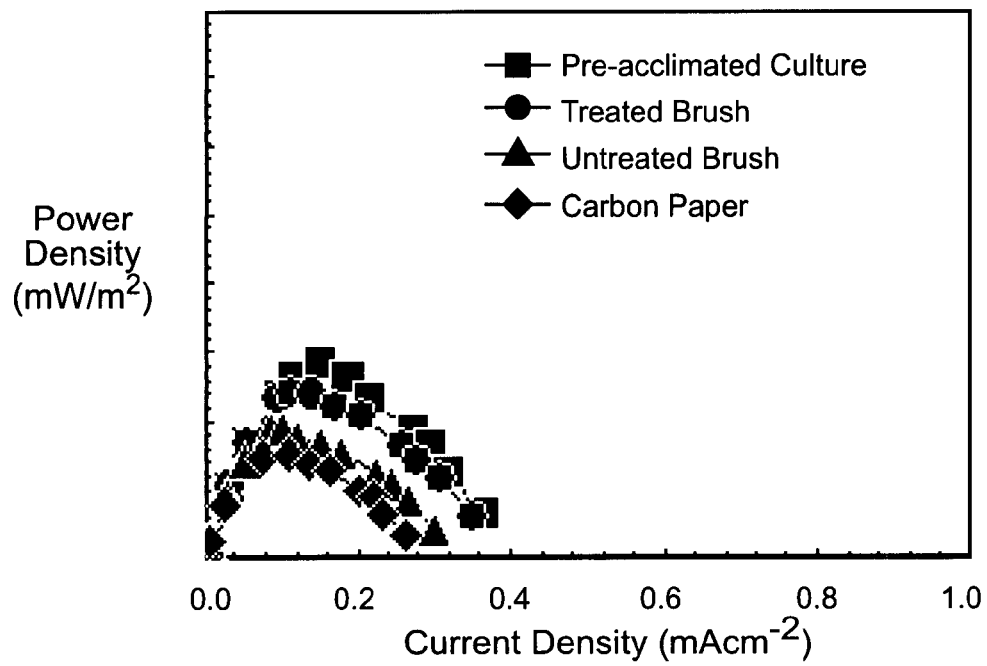
FIG. 18B is a graph showing power density curves for microbial fuel cells containing various types of anodes in 50 mM PBS.

Brush electrodes used in B-MFCs produced up to 1430 mW/m² (2.3 W/m³), compared to 600 mW/m² (0.98 W/m³) using carbon paper electrodes in a 200 mM PBS solution as shown in FIG. 18. Using a lower ionic strength solution reduced power production to 570 mW/m² (0.93 W/m³) with a brush anode, and 300 mW/m² (0.50 W/m³) with a carbon paper anode. This effect of solution conductivity shows that power increases with ionic strength (up to the tolerance of the bacteria) due to a reduction in ohmic resistance. The internal resistance of the brush B-MFC was 50Ω, with values for the other reactor conditions summarized in Table 1.

TABLE 1

Power production and internal resistances of MFCs containing various components (200 mM PBS).

| Reactor type | Anode | Internal Resistance (Ω) | Maximum Power (mW/m²) | (W/m³) |
|---|---|---|---|---|
| C-MFC | Small brush | 8 | 2400 | 73 |
| C-MFC[a] | Carbon cloth | 31 | 1070 | 29 |
| B-MFC | Large brush | 50 | 1200 | 2.0 |
| B-MFC | Large brush[b] | 49 | 1430 | 2.3 |
| B-MFC | Large brush, untreated | 58 | 750 | 1.2 |
| B-MFC | Carbon paper | 65 | 600 | 0.98 |

[a] 4 cm electrode spacing.
[b] Using an inoculum from a previously acclimated MFC To confirm that treatment of the brush electrodes with ammonia gas was an effective method of reducing the acclimation time and increasing power, additional tests were conducted using untreated brush anodes. Power production reached a maximum of 750 mW/m² with the untreated anode, which is 37% less than that obtained with ammonia treatment as shown in FIG. 18. Peak power production for the first cycle took 330 hours, compared to 136 hours with the treated electrodes, illustrating that the ammonia treatment reduces acclimation time. Power production with the brush electrodes was also substantially higher than that produced with an untreated carbon paper electrode, which produced a maximum of 600 mW/m².

Power Production Using Random Fibers.

Figure 19A:
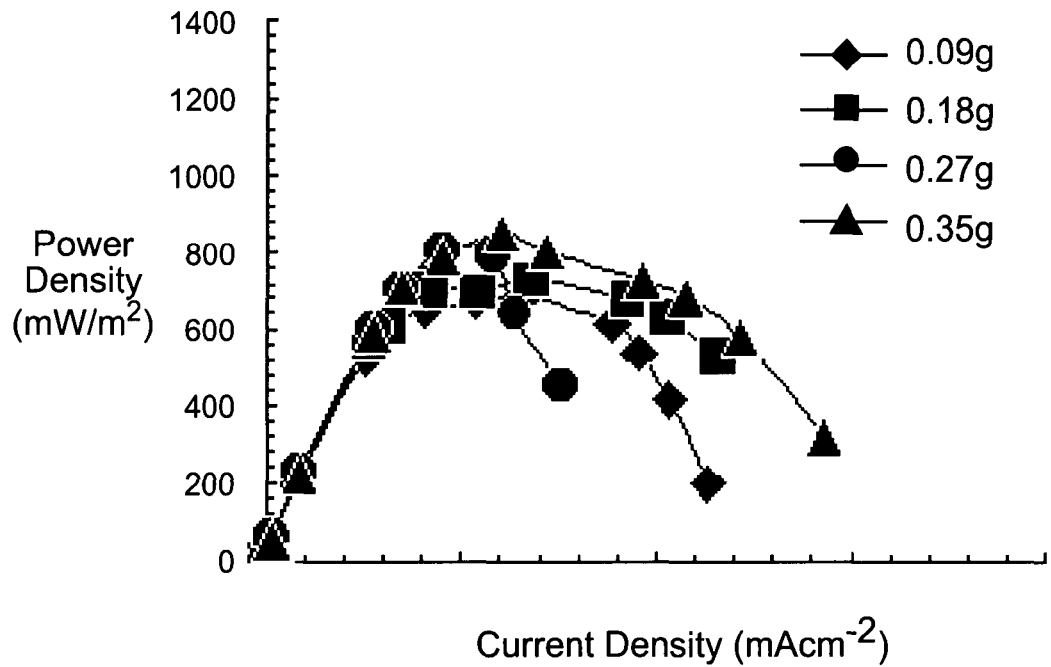
FIG. 19A is a graph showing power density curves using varied loadings of randomly distributed 10 micron diameter graphite fibers as the anode material.
Figure 19B:
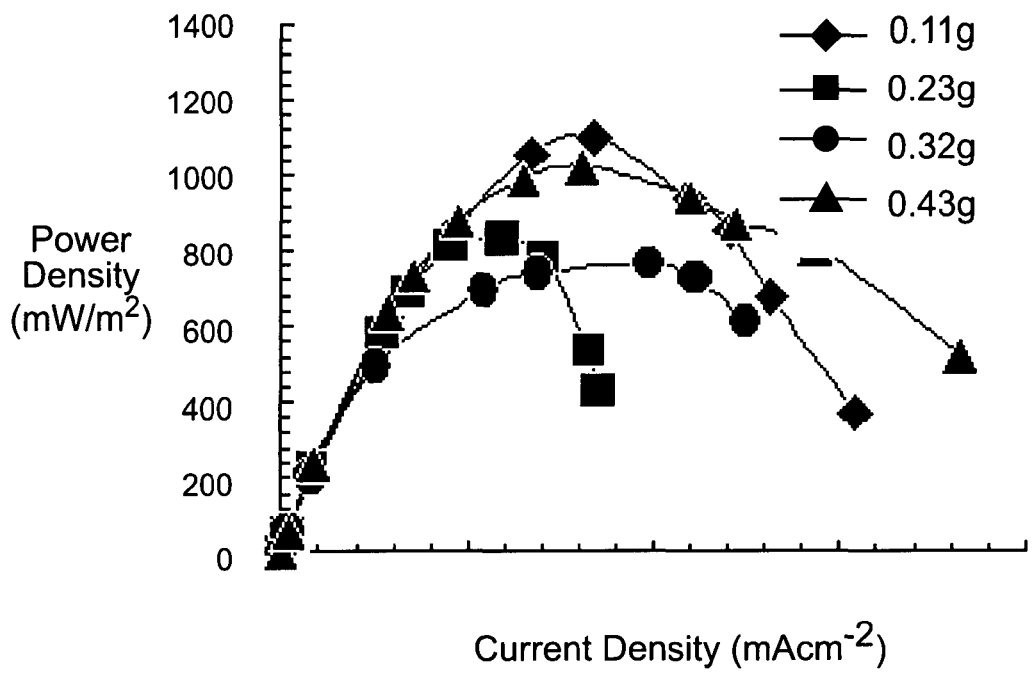
FIG. 19B is a graph showing power density curves using varied loadings of randomly distributed 6 micron diameter graphite fibers as the anode material.

The use of random or unstructured configurations of graphite fibers is examined using B-MFC reactors in this example. The maximum power production using a random or unstructured graphite fiber anode configuration was 1100 mW/m² using 0.11 g of 6 micron-diameter fibers, as shown in FIG. 19. Using 10-micron diameter fiber, power ranged from 690 mW/m² to 850 mW/m² for mass loadings of 0.09 g to 0.35 g. Power production using the 6 micron diameter fibers ranged from 770 to 1100 mW/m² as shown in FIG. 19.

Example 2

Cathode Preparation

An ultrafiltration hydrophilic tubular membrane (a polysulfone membrane on a composite polyester carrier) with an inner diameter of 14.4 mm (B0125, X-FLOW) and wall thickness of 0.6 mm is used as the tube-cathode. The tubes are cut to a length of 3, 6 or 12 cm (equal to a surface area of 13.5, 27 and 54 cm²) and then are coated with two coats of a commercially available graphite paint, ELC E34 Semi-Colloidal, Superior Graphite Co. Co-tetra-methyl phenylporphyrin (CoTMPP) is used as the cathode catalyst unless indicated otherwise. A CoTMPP/carbon mixture (20% CoTMPP) is prepared as described in Cheng, S. et al., *Environ. Sci. Technol.* 2006, 40, 364-369, and mixed with a 5% Nafion solution to form a paste using 7 microliters of Nafion per mg of CoTMPP/C catalyst. The paste is then applied to the air-facing surfaces of all tube-cathodes to achieve ~0.5 mg/cm² CoTMPP loading. In some tests a commercial carbon paper cathode containing Pt, 0.35 mg/cm² of Pt catalyst, water proofed paper, E-Tek; $A_{cat}$=7 cm², is used with the catalyst facing the water solution. A 3-cm tube-cathode containing only graphite paint is prepared as a non-catalyst control.

Anode Preparation

The anode electrode is either a piece of plain Toray carbon paper, without wet proofing; E-Tek; $A_{an}$=7 cm², or a plain graphite fiber brush, 25 mm diameter×25 mm length; fiber type: PANEX® 33 160K, ZOLTEK, with an estimated surface area of 2235 cm² (95% porosity).

Tube-Cathode Reactors with Carbon Paper Anodes

Each reactor configuration is referred to in this example using the notation of X-YZ-J, where: X=anode material (C=carbon paper, B=graphite brush); Y=cathode material (C=carbon paper, $T_n$=number of 3-cm lengths of tube cathodes, where n=1 to 4); Z=catalyst (Pt=platinum; Co=CoTMPP; C=carbon without catalysts); and J=cathode configuration (I=inside reactor, O=outside reactor).

Three single-chamber carbon paper anode (C) MFCs are constructed with the tube-cathodes located inside (I) cylindrical chambered reactors, 4 or 6 cm length×3 cm diameter, as noted in Table 2, FIG. 24. Table 2 shows electrode types and surface areas used in this example, as well as ratios of electrode area to volume, volumes, internal resistances, maximum power density normalized to anode surface area or total reactor volume, and CEs for all carbon paper and brush anode MFC batch tests in this example.

Two reactors are constructed with CoTMPP coated tube-cathodes (TCo). One has a single 3-cm tube (C-T₁Co-I; 4-cm chamber), for a total cathode surface area of $A_{cat}$=13.5 cm², and a surface area normalized to the reactor volume of $A_{cat,s}$=59 m²/m³, while the other has two 3-cm tubes connected by a wire (C-T₂Co-I; 6-cm chamber; $A_{cat}$=27 cm², $A_{cat,s}$=84 m²/m³).

A third reactor system is constructed containing a single 3-cm tube-cathode without any catalyst, C-T₁C-I; 4-cm chamber; $A_{cat}$=13.5 cm², $A_{cat,s}$=59 m²/m³.

Each cathode tube is inserted through the center of a single 2 cm-long slice of the chamber, with the carbon paper anode placed at an opposite side of another 2 cm-long slice. The CoTMPP catalyst layer is coated on the inside of these tubes (membrane side) and faced air.

A single-chamber cube MFC of same type as described in Liu, H. et al., *Environ. Sci. Technol.* 2004, 38, 4040-4046, is also tested by using a carbon paper anode and a carbon paper cathode with a Pt catalyst (C-CPt-I; $A_{cat}$=7 cm², $A_{cat,s}$=25 m²/m³), with the electrodes placed at opposite sides of the chamber (4 cm length×3 cm diameter).

Tube-Cathode Reactors with Brush Anodes

Two different brush anode (B) MFC configurations are tested with tube cathodes containing a CoTMPP catalyst (TCo): a cylindrical chambered MFC (6 cm long×3 cm diameter) with tubes inside (I) the reactor (B-T₂Co-I); and the same type of reactor (4 cm×3 cm diameter), but with the tube-cathode placed outside (O) the reactor (B-T₂Co-O) as noted in Table 2.

For the inside tube reactor, a graphite brush anode is placed vertically in a 2-cm long reactor slide, and two wire-connected tube cathodes each 3-cm long are inserted through adjacent 2 cm slices producing a 6-cm long reactor (B-T₂Co-I; $A_{cat}$=27 cm², $A_{cat,s}$=93 m²/m³). The catalyst is coated on the inside of the tube (membrane side) and faced the air. The MFC with the cathode tube placed outside of the cube reactor are constructed using a brush anode placed horizontally in the center of a 4-cm long chamber, with a single 6-cm long (2×3 cm) cathode tube extending from one side of the chamber (B-T₂Co-O; $A_{cat}$=27 cm², $A_{cat,s}$=75 m²/m³). In this case, the catalyst is coated on the outside of the tube (supporting side of membrane) and faced the air.

To further investigate the effect of cathode surface area, additional 3-cm tube-cathodes are added to the inside of the MFCs, with external wires connecting the tubes (B-T₃Co-I and B-T₄Co-I). For reactors with tubes outside the reactor, the tube length is increased to 12 (4×3) cm (B-T₄Co-O), producing a cathode surface area of 54 cm².

Start Up and Operation

All MFCs in this example are inoculated with a 50:50 mixture of domestic wastewater (~300 mg-COD/L) and glucose (0.8 g/L) in phosphate buffer solution (PBS, 50 mM; pH=7.0) in a nutrient medium as described in Liu, H. et al., *Environ. Sci. Technol.* 2004, 38, 4040-4046.

After 2-3 repeated feeding cycles, only media (no wastewater) is added. Reactors are considered to be acclimated if the maximum voltage produced is repeatable for at least three batch cycles. Following these tests, brush anode reactors are switched to 200 mM PBS as solution conductivity increases power generation. The medium in the reactor is refilled when the voltage dropped below ~20 mV (resistances of 40 to 500Ω) or ~40 mV (1000 to 3000Ω).

Reactors with brush anodes and tube cathodes placed inside or outside the reactor are also operated in continuous flow mode with a hydraulic retention time (HRT) of 24 hours (total volume of reactor. The influent is fed from the anode side by using a micro-infusion pump (AVI micro 210A infusion pump, 3M), with the flow discharged from the cathode side. These experiments are performed at 30° C.

Calculations and Measurements

The Voltage (V) output of all reactors are measured across a fixed external resistance (1000Ω except as noted) using a data acquisition system (2700, Keithly, USA). Electrode potentials are measured using a multimeter (83 μm, Fluke, UAS) and a reference electrode (Ag/AgCl; RE-SB, Bioanalytical systems, USA). Current (I=V/R), power (P=IV), and CE (based on the input glucose) are calculated as described in Zuo, Y.; et al., *Energy & Fuels.* 2006, 20(4), 1716-1721. Power and current density are either normalized to the projected area of carbon paper anodes (m²) or the total reactor volume (m³).

To obtain the polarization curve and power density curve as a function of current, external circuit resistances are varied from 40-3000Ω. For batch tests, one resistor is used for a full cycle (at least 24 hours) for at least two separate cycles, while for continuous flow tests at least 24 hours is used for each resistor.

Internal resistance, $R_{int}$, is measured by electrochemical impedance spectroscopy (EIS) over a frequency range of $10^5$ to 0.005 Hz with sinusoidal perturbation of 10 mV amplitude using a potentiostat (PC 4/750 potentiostat, Gamry Instrument Inc.) for carbon paper anode MFCs filled with a nutrient media containing 50 mM PBS and brush anode reactors using 200 mM PBS. The anode is used as the working electrode and the cathode as the counter and reference electrode as described in Cheng, S. et al., *Environ. Sci. Technol.* 2006. 40, 2426-2432.

The maximum rate of oxygen transfer through a tube-cathode is determined by measuring oxygen accumulation in an uninoculated carbon paper anode MFC reactor containing a clean 3-cm tubular membrane (without any graphite/catalysts) and de-oxygenated deionized water. The effective oxygen mass transfer coefficient of k is determined as described in Cheng, S. et al., *Electrochem Commun.* 2006, 8, 489-494, with a dissolved oxygen probe (Foxy-21G, Ocean Optics Inc., F1) placed at the centre of the stirred reactor. The resistance of proton transport through the tubular membrane cathode is determined by measuring the internal resistance increase when adding this membrane material between two carbon electrodes in a two-chamber cube reactor as described in Kim, J. et al., Environ. Sci. Technol. 2007. 41(3), 1004-1009. The membrane tube is sliced open, cut into a circular shape to produce a flat surface of 7 cm$^2$, and then placed in the middle of the reactor with carbon electrodes each spaced 2 cm from the membrane. The internal resistances of the reactor with the membrane ($R_{int,m+}$) and without any membrane ($R_{int,m-}$) are measured by EIS using a potentiostat. The proton transport resistivity ($\Omega \cdot cm^2$) of the tubular membrane is calculated as $(R_{int,m+} - R_{int,m-}) \times A_{mem}$.

COD concentrations of the reactor effluent are measured using standard methods such as described in American Public Health Association; American Water works association; Water Pollution Control Federation. Standard Methods for the Examination of Water and Wastewater, 19th ed.; Washington D.C. 1995.

Power Production from Tube Reactors with Carbon Paper Anodes

Figure 20A:
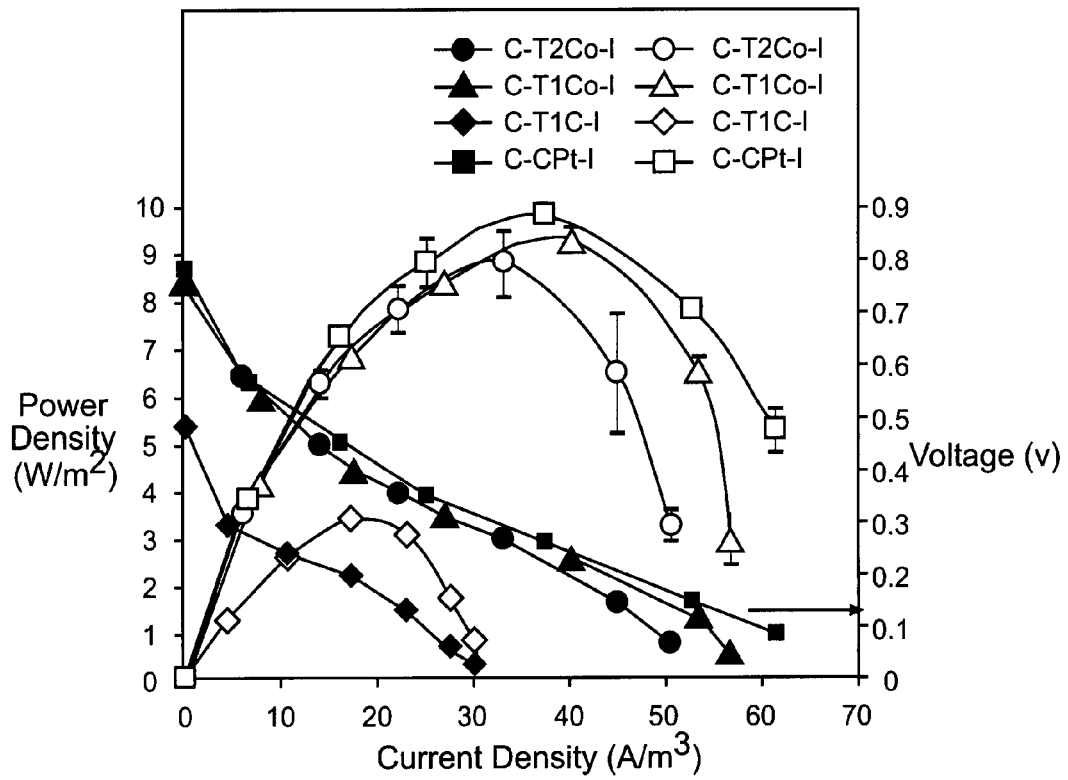
FIG. 20A is a graph showing power density, open symbols, voltage, filled symbols as a function of current density normalized to total reactor volume, obtained by varying the external circuit resistance (40-3000Ω) for carbon paper anode microbial fuel cells.

Repeatable cycles of power production are rapidly generated after acclimation of all four carbon paper anode MFC reactors. FIG. 20A shows power density, open symbols, voltage, filled symbols as a function of current density normalized to total reactor volume, obtained by varying the external circuit resistance (40-3000Ω) for carbon paper anode MFCs. Error bars are ±S.D. based on averages measured during stable power output in two or more separate batch experiments.

Power density curves and polarization curves obtained by varying the external circuit resistances from 40-3000Ω show that the tube-cathode MFC with two CoTMPP coated tubes (C-T$_2$Co-I; $A_{cat}$=27 cm$^2$) produced power only somewhat less than that achieved with a carbon paper cathode with Pt catalyst (C-CPt-I; $A_{cat}$=7 cm$^2$), with a maximum power density of 8.8±1.0 W/m$^3$ (403±33 mW/m$^2$, anode surface area) for the tube-cathode system and 9.9±0.1 W/m$^3$ (394±3 mW/m$^2$) for the carbon paper cathode, both at $R_{ext}$=250Ω; shown in FIG. 20A. Decreasing the tube-cathode area by 50% (C-T$_1$Co-I, $A_{cat}$=13.5 cm$^2$) slightly affected the volumetric power density (9.3±0.3 W/m$^3$; $R_{ext}$=250Ω) due to the reduced volume without the cathode, but reduced power by 24% on the basis of the anode surface area (306±8 mW/m$^2$). In the absence of a catalyst, the tube reactor (C-T$_1$C-I, $A_{cat}$=13.5 cm$^2$) produced much less power, or 3.1±0.1 W/m$^3$ ($R_{ext}$=250Ω), shown in FIG. 20A. The internal resistances of these four MFCs ranged from 84 to 131Ω (Table 2).

Figure 20B:
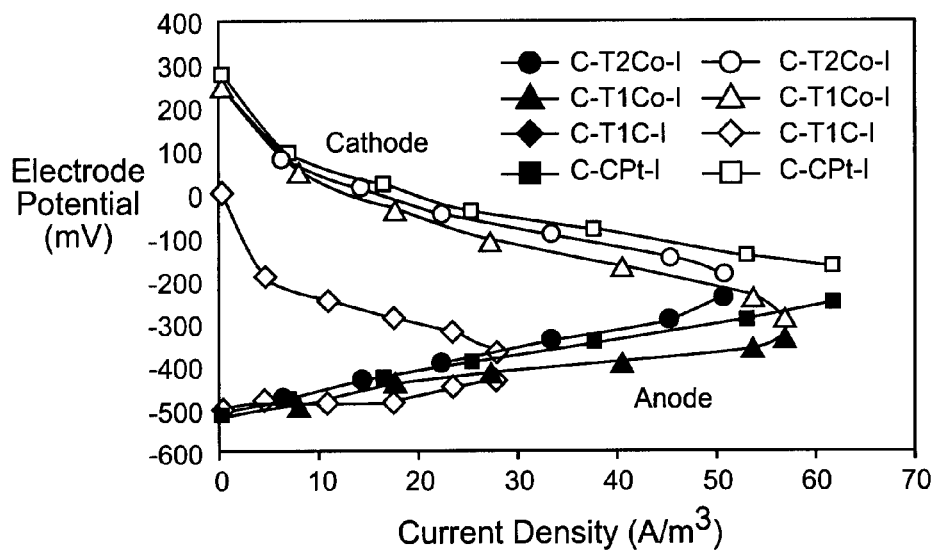
FIG. 20B is a graph showing electrode potentials, cathode open symbols, anode filled symbols, as a function of current density normalized to total reactor volume, obtained by varying the external circuit resistance (40-3000Ω) for carbon paper anode microbial fuel cells.

FIG. 20B shows electrode potentials, cathode open symbols, anode filled symbols, as a function of current density normalized to total reactor volume, obtained by varying the external circuit resistance (40-3000Ω) for carbon paper anode MFCs. Error bars are ±S.D. based on averages measured during stable power output in two or more separate batch experiments. FIG. 20B shows that these carbon paper anode MFCs each had similar anode potentials at the same current. The differences in power productions from these four MFC reactors are a result of the differences in cathode potentials. Tube-cathode potentials are improved by adding CoTMPP as the catalyst and/or increasing the cathode surface area. With 13.5 or 27 cm$^2$ of surface area, the CoTMPP coated tube-cathodes (C-T$_1$Co-I and C-T$_2$Co-I) achieved almost same potentials as the carbon paper Pt cathode (C-CPt-I) over the current density range of 0-60 A/m$^3$.

Power Production from Tube Reactors with Brush Anodes.

Figure 21A:
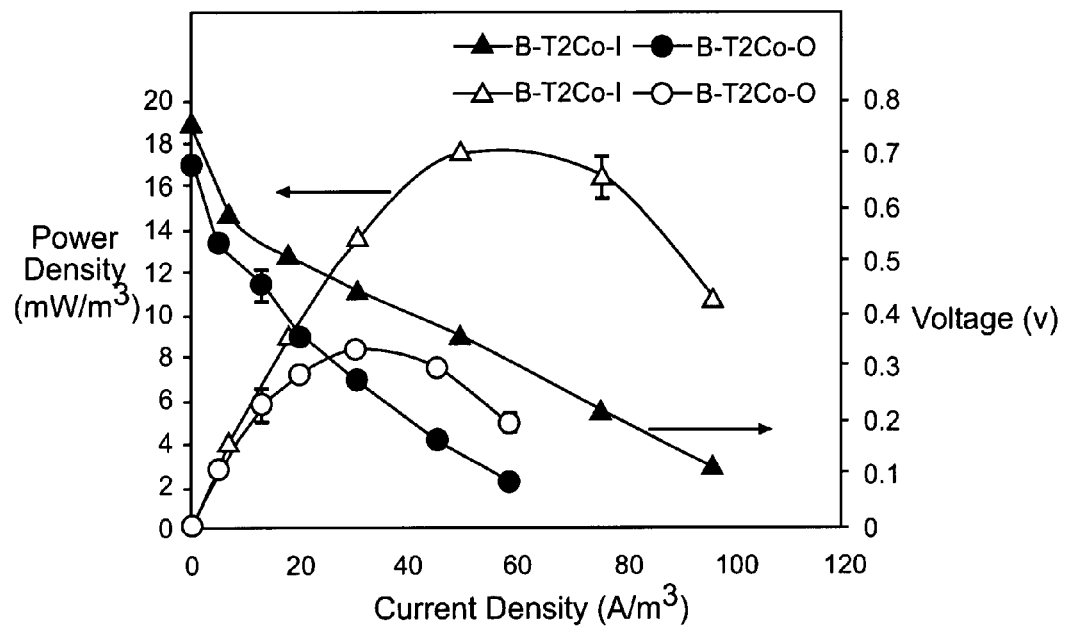
FIG. 21A is a graph showing power density (open symbols), voltage (filled symbols) as a function of current density based on reactor volume obtained by varying the external circuit resistance (40-3000Ω) for brush anode microbial fuel cells.

All of the tube-reactors with brush anodes used in this example generated repeatable power cycles after ~14 batch cycles (50 mM PBS). FIG. 21A shows power density (open symbols), voltage (filled symbols) as a function of current density based on reactor volume obtained by varying the external circuit resistance (40-3000Ω) for these brush anode MFCs. Error bars are ±S.D. based on averages measured during stable power output in two or more separate batch experiments separate batch experiments.

After the buffer concentration is increased to 200 mM, a maximum volumetric power density of 17.7±0.2 W/m$^3$ ($R_{ext}$=250Ω) is produced with two 3-cm tube cathodes inside the reactor (B-T$_2$Co-I, $A_{cat}$=27 cm$^2$) as shown in FIG. 21A. The 200% increased power produced with the brush versus the carbon paper anode in the same type of tube-cathode reactor (C-T$_2$Co-I, 8.8±1.0 W/m$^3$) is consistent with an overall reduction in internal resistance (from 89 to 66Ω) and a significant increase of the anode area (from 7 to 2235 cm$^2$). The power produced with brush anode and tube-cathodes inside the reactor is also double the maximum power of 8.2±0.2 W/m$^3$ ($R_{ext}$=250Ω) from the brush reactor with a single 6-cm tube placed outside (B-T$_2$Co-O, $A_{cat}$=27 cm$^2$) shown in FIG. 21A.

Figure 21B:
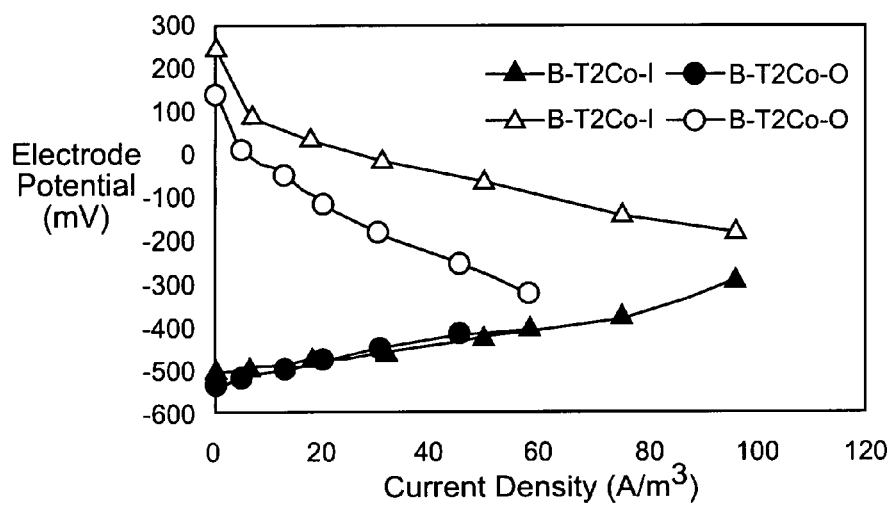
FIG. 21B is a graph showing electrode potentials (cathode open symbols, anode filled symbols) as a function of current density based on reactor volume obtained by varying the external circuit resistance (40-3000Ω) for brush anode microbial fuel cells.

FIG. 21B shows electrode potentials (cathode open symbols, anode filled symbols) as a function of current density based on reactor volume obtained by varying the external circuit resistance (40-3000Ω) for brush anode MFCs. Error bars are ±S.D. based on averages measured during stable power output in two or more separate batch experiments separate batch experiments. The increase in power output with the tubes inside the reactor is caused by the higher cathode potentials as the brush anode potentials remained unchanged over a current range of 0-58 A/m$^3$, see FIG. 21B. The OCP of the cathode when inside the reactor (250±8 mV, vs Ag/AgCl) is 112 mV higher than when it is placed outside the reactor (138±16 mV). As the current increased, the potential difference further increased to 240 mV at 58 A/m$^3$ as shown in FIG. 21B.

Coulombic Efficiencies Using Tube-Cathodes.

The CEs of all reactors are a function of current densities (Table 1; additional information in supporting information). With carbon paper anodes, the tube-cathodes with a CoTMPP catalyst achieved CEs as high as 40%, while carbon paper cathodes with Pt (C-CPt-I) had CEs of 7-19%. Without a catalyst (C-T$_1$C-I), the CEs for the tube-cathode reactor ranged from 18 to 22%. By using a graphite brush anode, and increasing the solution ionic strength using 200 mM PBS further increased the CE to 52-58% when the tube is placed outside the reactor (B-T$_2$Co-O), and 70-74% for the tube inside one (B-T$_2$Co-I).

The higher CEs obtained with tube-cathode reactors are thought to be due to lower $O_2$ diffusion rates through the tubular ultrafiltration membrane than through the carbon paper cathode. For a clean tubular membrane, we measured an $O_2$ mass transfer coefficient k=$7.8 \times 10^{-5}$ cm/s, which could result in as much oxygen transfer as 0.03 mgO$_2$/h into an MFC system with a tube-cathode surface area of 13.5 cm$^2$ (C-T$_1$Co-I and C-T$_1$C-I), or 0.06 mgO$_2$/h for a surface area of 27 cm (C-T$_2$Co-I, B-T$_2$Co-I and B-T$_2$Co-O). In contrast, a carbon paper cathode of 7 cm$^2$ (C-CPt-I) produced an oxygen rate of 0.187 mg/h, Liu, H. et al., Environ. Sci. Technol. 2004, 38, 4040-4046. It therefore seems likely that the higher CEs of the tube cathode system are due to the reduction in substrate lost to aerobic oxidation supported by oxygen diffusion through the cathode.

Effect of Tube-Cathode Surface Area.

Figure 22A:
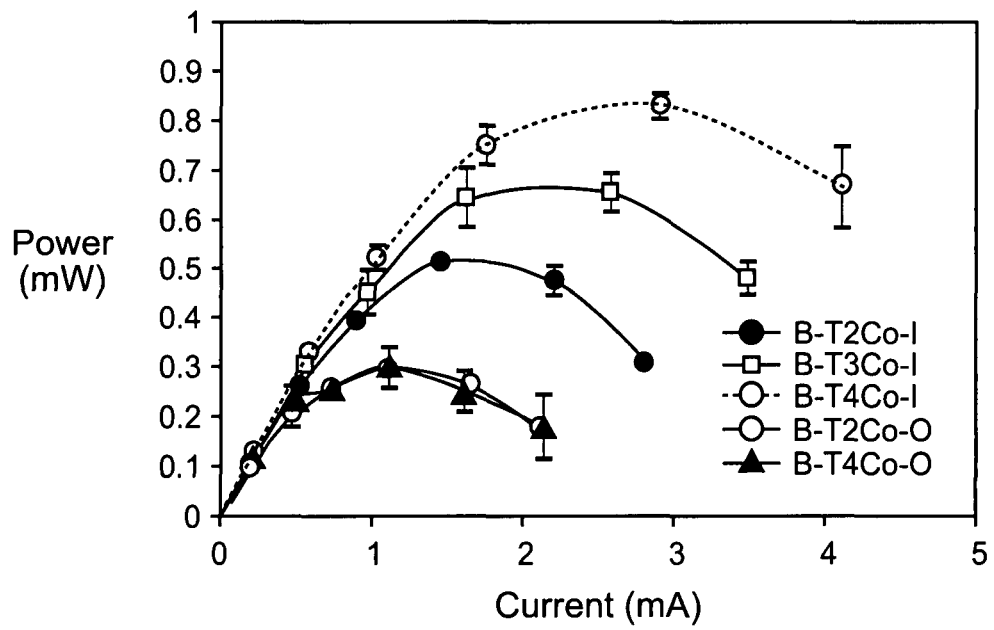
FIG. 22A is a graph showing power as a function of the cathode surface area of tube-cathode microbial fuel cells with brush anodes.
Figure 22B:
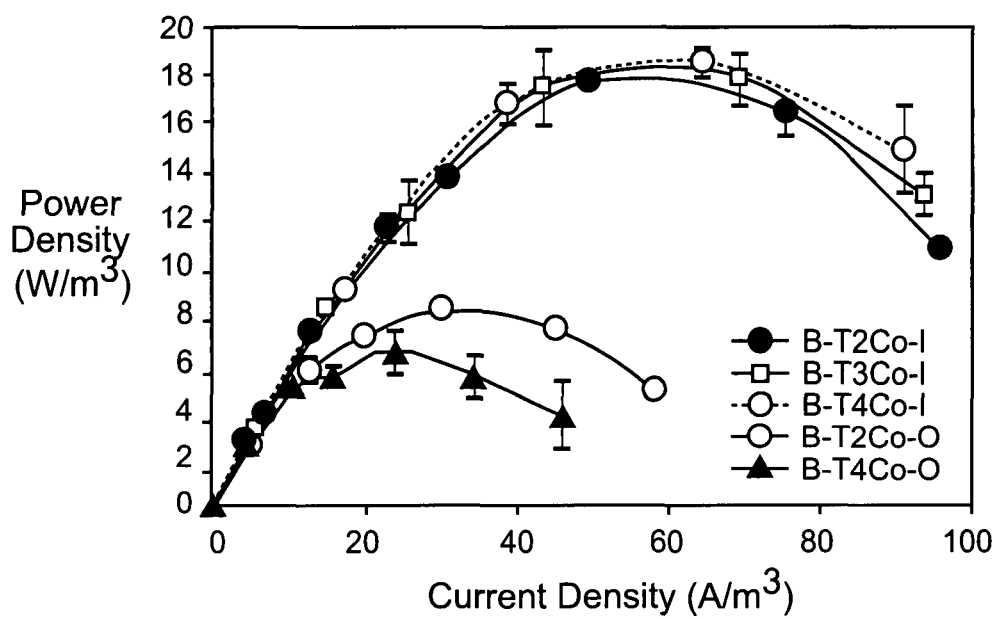
FIG. 22B is a graph showing volumetric power density as a function of the cathode surface area of tube-cathode microbial fuel cells with brush anodes.

The effect of tube-cathode surface area is investigated for brush anode reactors with the tube-cathodes placed inside or outside the reactor. FIGS. 22A and 22B show power (A) and volumetric power density (B) as a function of the cathode surface area of tube-cathode MFCs with brush anodes. Error bars in these figures are ±S.D. based on averages measured during stable power output in two or more separate batch experiments. The cathode surface areas for both configurations are increased from 27 ($T_2$) to 40.5 ($T_3$) or 54 cm² ($T_4$), by adding more 3-cm tubes inside the reactor (B-$T_3$Co-I and B-$T_4$Co-I) or extending the length of the outside tube up to 12 cm (B-$T_4$Co-O). For the tubes inside the reactor, the maximum power output increased with cathode surface area, producing 0.51 mW (B-$T_2$Co-I), 0.66 mW (B-$T_3$Co-I) and 0.83 mW (B-$T_4$Co-I) (FIG. 22A). Since the reactor volume also increased by 8 ml when adding each 3-cm tube, however, the volumetric power densities produced by these different reactors with the tubes inside the reactor are similar when normalized to volume, producing for all cases a maximum of ~18 W/m³ (FIG. 22B). When the tube is placed outside the reactor, the maximum power output is not improved with increased tube length (FIG. 22A). Although both reactors produced ~0.3 mW, the longer tube-cathode added 10 ml more volume than the shorter one, resulting in a decrease in volumetric power from 8.2 (B-$T_2$Co-O) to 6.5 W/m³ (B-$T_4$Co-O) (FIG. 22B).

Continuous Flow Performance of Tube-Cathode Reactors.

Figure 23A:
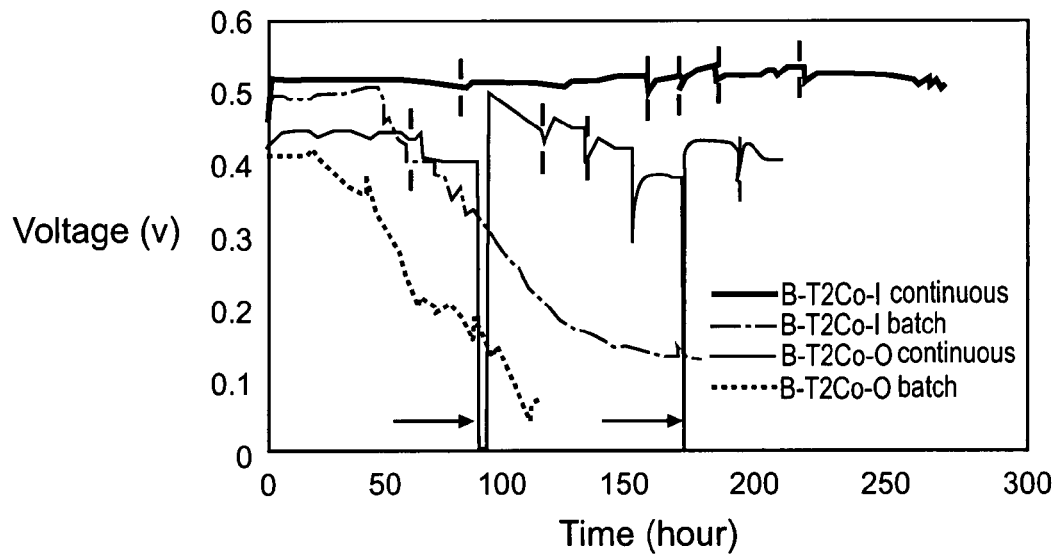
FIG. 23A is a graph showing Figures voltage as a function of time at a fixed resistance of 1000Ω (except as noted) for brush anode microbial fuel cells operated in continuous or batch mode.
Figure 23B:
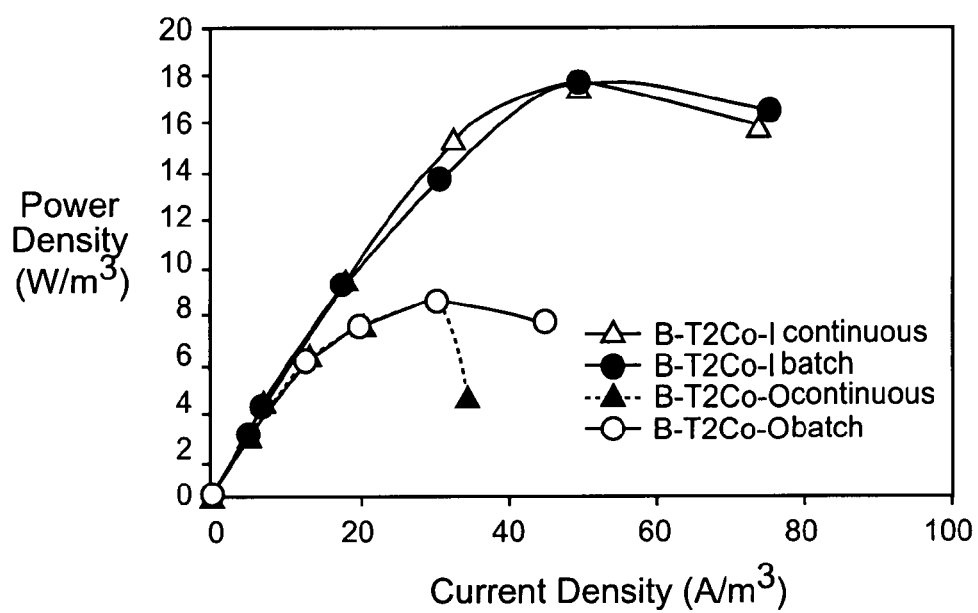
FIG. 23B is a graph showing volumetric power density as a function of current normalized to volume obtained by varying the external circuit resistance (40-3000Ω) for brush anode microbial fuel cells operated in continuous or batch mode.

Two brush anode MFCs with the tube cathodes inside or outside the reactor are operated in continuous flow mode. FIGS. 23A and 23B show voltage as a function of time at a fixed resistance of 1000Ω (except as noted) (A) and volumetric power density as a function of current normalized to volume (B) obtained by varying the external circuit resistance (40-3000Ω) for brush anode MFCs operated in continuous or batch mode. Vertical lines indicate where the external resistance was changed for polarization curve measurements. Arrows indicate the replacement of the tube cathode outside the reactor. With the tubes inside the reactor (B-$T_2$Co-I; $A_{cat}$=27 cm²), the voltage output (520 mV at 1000Ω) is immediately produced and is stable for more than 10 HRTs (FIG. 23A). Power density curves showed that the performance is identical to that produced in fed-batch tests, resulting in a maximum power density of ~18 W/m³ (FIG. 23B).

Power density curves measured for the MFC with the tube outside the reactor are also similar for continuous and fed batch operation (FIG. 23B). However, the voltage produced by this reactor (B-$T_2$Co-O, $A_{cat}$=27 cm²) is unstable over time, and decreased from 500 to 380 mV (1000Ω) (FIG. 23A).

The effluents from both reactors operated in continuous flow mode are analyzed with a fixed external resistor of 1000Ω. The reactor with the tube outside the MFC produced a COD removal of 53±5%, compared to 37±5% when the tubes are inside the reactor.

Internal Resistance Contributed by Tube-Cathodes.

The internal resistance with a flat piece of tubular membrane material (7 cm²) placed between two carbon electrodes in a two-chamber cube reactor, is measured as $R_{int,m+}$=247±6Ω. When the membrane is removed, the internal resistance is $R_{int,m-}$=84±1Ω. These resistances indicate that the proton transport resistivity of the membrane is 1141Ω·cm², resulting in internal resistances of 84Ω or 42Ω for the 13.5 cm² or 27 cm² tubular membrane cathodes. This indicates that the membrane accounted for up to 64% of the total internal resistances of the tube-cathode reactors.

Any patents or publications mentioned in this specification are incorporated herein by reference to the same extent as if each individual publication is specifically and individually indicated to be incorporated by reference. U.S. Provisional Patent Application 60/796,761, filed May 2, 2006, is incorporated herein by reference in its entirety.

The compositions and methods described herein are presently representative of preferred embodiments, exemplary, and not intended as limitations on the scope of the invention. Changes therein and other uses will occur to those skilled in the art. Such changes and other uses can be made without departing from the scope of the invention as set forth in the claims.

The invention claimed is:

1. A microbial fuel cell, comprising:
an electrode module, comprising a cathode having a longest dimension, the cathode comprising a membrane, the membrane forming a cathode wall generally enclosing and defining an interior space, the cathode wall having an internal surface adjacent the interior space and an opposed external surface, the wall extending between a first end and a second end; and an anode disposed in the interior space fowled by the cathode wall, the anode having a longest dimension and an anode surface area greater than 100 m²/m³, the anode substantially non-toxic to anodophilic bacteria; and
an electrically conductive connector connecting the anode and the cathode, wherein the anode and cathode are positionable such that the longest dimension of the anode is at an angle in the range between 0 and 180 degrees with respect to the longest dimension of the cathode, and wherein the ratio of the anode surface area to the cathode surface area is in the range of 1.5:1-1000:1.

2. The microbial fuel cell of claim 1 wherein the membrane is selected from the group consisting of: a nanofiltration membrane, an ultrafiltration membrane, and an ion exchange membrane.

3. The microbial fuel cell of claim 1 further comprising a conductive material in contact with the internal surface or the external surface of the membrane, the conductive material in electrically conductive connection with the electrically conductive connector.

4. The microbial fuel cell of claim 3 wherein the conductive material is a carbon-based material.

5. The microbial fuel cell of claim 3 wherein the conductive material is graphite.

6. The microbial fuel cell of claim 3 wherein the conductive material is a carbon-based coating, the carbon-based coating present on at least about 50% of the internal surface or the external surface of the membrane.

7. The microbial fuel cell of claim 1, further comprising a catalyst.

8. The microbial fuel cell of claim 7, wherein the catalyst is selected from the group consisting of: a metal-containing catalyst, a non-metal containing catalyst, and a combination thereof.

9. The microbial fuel cell of claim 1, wherein the anode is a brush anode.

10. The microbial fuel cell of claim 1, comprising two or more anodes.

11. The microbial fuel cell of claim 1, comprising two or more cathodes.

12. The microbial fuel cell of claim 1, further comprising a power source for enhancing an electrical potential between the anode and the cathode in order to produce hydrogen from the microbial fuel cell, the power source in electrical communication with the anode and the cathode.

13. The microbial fuel cell of claim 12 wherein the power source is a second microbial fuel cell, the second microbial fuel cell configured to produce electricity.

14. A microbial fuel cell, comprising:
an anode having a specific surface area greater than 100 $m^2/m^3$, the anode substantially non-toxic to anodophilic bacteria;
a cathode comprising a membrane, the membrane forming a cathode wall generally enclosing and defining an interior space, the anode disposed in the interior space; and
an electrically conductive connector connecting the anode and the cathode.

15. The microbial fuel cell of claim 14, wherein the anode comprises one or more conductive fibers.

16. The microbial fuel cell of claim 15, wherein the one or more conductive fibers is attached to a conductive core support.

17. The microbial fuel cell of claim 16, wherein each individual fiber of the one or more conductive fibers is attached to the conductive core support.

18. The microbial fuel cell of claim 16, wherein at least a portion of the one or more fibers comprises one or more carbon fibers.

19. The microbial fuel cell of claim 14, comprising two or more anodes.

20. The microbial fuel cell of claim 14, comprising two or more cathodes.

21. The microbial fuel cell of claim 14, further comprising a power source for enhancing an electrical potential between the anode and the cathode in order to produce hydrogen from the microbial fuel cell, the power source in electrical communication with the anode and the cathode.

22. The microbial fuel cell of claim 21 wherein the power source is a second microbial fuel cell, the second microbial fuel cell configured to produce electricity.

23. The cathode for a microbial fuel cell of claim 14 further comprising a conductive material in contact with the internal surface or the external surface of the membrane, the conductive material in electrically conductive connection with the electrically conductive connector.

24. The cathode for a microbial fuel cell of claim 23 wherein the conductive material is a carbon-based material.

25. The cathode for a microbial fuel cell of claim 23 wherein the conductive material is graphite.

26. The cathode for a microbial fuel cell of claim 23 wherein the conductive material is present on at least about 50% of the internal surface or the external surface of the membrane.

27. The cathode for a microbial fuel cell of claim 14, further comprising a catalyst selected from the group consisting of: a catalyst for enhancement of oxygen reduction and a catalyst for enhancement of proton reduction.

28. The cathode of claim 14, wherein at least one of the first or second ends is closed.

29. The cathode of claim 14, wherein the interior space is at least partially filled with a liquid.

30. The cathode of claim 14, wherein the wall has a shape selected from the group consisting of: generally cylindrical and generally hollow slab-shaped.

31. A microbial fuel cell, comprising:
an anode having a specific surface area greater than 100 $m^2/m^3$ and a porosity of 90% or greater, wherein the anode is substantially non-toxic to anodophilic bacteria;
a cathode comprising a polyolefin-containing membrane, the membrane forming a cathode wall generally enclosing and defining an interior space, the anode disposed in the interior space; and
an electrically conductive connector connecting the anode and the cathode.

* * * * *